(12) United States Patent
Koh et al.

(10) Patent No.: US 8,163,422 B2
(45) Date of Patent: Apr. 24, 2012

(54) ELECTROCHEMICAL DEVICE

(75) Inventors: Meiten Koh, Settsu (JP); Hideo Sakata, Settsu (JP); Hitomi Nakazawa, Settsu (JP); Michiru Tanaka, Settsu (JP); Akiyoshi Yamauchi, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 507 days.

(21) Appl. No.: 12/373,442

(22) PCT Filed: Jul. 12, 2007

(86) PCT No.: PCT/JP2007/063899
§ 371 (c)(1),
(2), (4) Date: Jan. 12, 2009

(87) PCT Pub. No.: WO2008/007734
PCT Pub. Date: Jan. 17, 2008

(65) Prior Publication Data
US 2009/0305144 A1 Dec. 10, 2009

(30) Foreign Application Priority Data

Jul. 13, 2006 (JP) ................................ 2006-193306
Nov. 2, 2006 (JP) ................................ 2006-299379
Feb. 15, 2007 (JP) ................................ 2007-035054

(51) Int. Cl.
*H01M 6/04* (2006.01)
(52) U.S. Cl. ........ 429/199; 429/200; 429/332; 429/331; 252/62.2
(58) Field of Classification Search .................. 429/199, 429/200, 332, 331; 252/62.2
See application file for complete search history.

(56) References Cited

U.S. PATENT DOCUMENTS

| 7,229,718 | B2 * | 6/2007 | Yamaguchi et al. | .......... 429/200 |
| 7,790,312 | B2 * | 9/2010 | Costello et al. | ............... 429/200 |
| 2004/0038133 | A1 | 2/2004 | Yamaguchi et al. | |

FOREIGN PATENT DOCUMENTS

| CN | 1287695 A | 3/2001 |
| CN | 1477729 A | 2/2004 |
| EP | 1 039 570 A1 | 9/2000 |
| JP | 2000-294281 A | 10/2000 |
| JP | 2004-055320 A | 2/2004 |
| KR | 10-2006-0014280 A | 2/2006 |
| WO | 2006/016733 A1 | 2/2006 |
| WO | WO 2006/017533 | * 2/2006 |

* cited by examiner

*Primary Examiner* — Laura Weiner
(74) *Attorney, Agent, or Firm* — Sughrue Mion, PLLC

(57) ABSTRACT

There is provided an electrochemical device provided with an electrolytic solution comprising (I) a solvent for dissolving an electrolyte salt comprising (A) a fluorine-containing ether represented by the formula (1):

$$R_f^1\text{—O—}R_f^2$$

wherein $R_f^1$ and $R_f^2$ are the same or different and each is a fluorine-containing alkyl group having 3 to 6 carbon atoms, (B) a cyclic carbonate, and (C) a chain carbonate being compatible with both of the fluorine-containing ether (A) and the cyclic carbonate (B), and (II) an electrolyte salt, in which the solvent (I) for dissolving an electrolyte salt comprises 30 to 60% by volume of the fluorine-containing ether (A), 3 to 40% by volume of the cyclic carbonate (B) and 10 to 67% by volume of the chain carbonate (C) based on the whole solvent (I), and when the electrochemical device is provided with such an electrolytic solution, no phase separation occurs even at low temperature, flame retardancy and heat resistance are excellent, solubility of an electrolyte salt is high, discharge capacity is large, and charge and discharge cycle characteristics are satisfactory.

12 Claims, No Drawings

ELECTROCHEMICAL DEVICE

TECHNICAL FIELD

The present invention relates to an electrochemical device provided with an electrolytic solution comprising a specific fluorine-containing ether and being stable at low temperature and excellent in flame retardancy.

BACKGROUND ART

Carbonates such as ethylene carbonate, propylene carbonate and dimethyl carbonate are generally used as a solvent for dissolving an electrolyte salt for lithium secondary battery. However since these hydrocarbon carbonates are low in a flash point and have high combustibility, there is a danger of firing and explosion by over-charging and over-heating, which is an important problem to be solved for securing safety especially in the cases of large size lithium secondary batteries for hybrid cars and distributed power source.

For preventing explosion of an electrolytic solution, means for blending fluoroalkane, phosphoric ester or phosphorus compound as an additive to the electrolytic solution are proposed (JP11-233141A, JP11-283669A, JP2002-280061A and JP9-293533A).

However, in a system where fluoroalkane is added, fluoroalkane itself is hardly compatible with carbonates being essential as components of an electrolytic solution, thereby causing phase separation and deteriorating battery performance.

Also, in a system where phosphoric ester or phosphorus compound is added, combustibility of an electrolytic solution is inhibited, but viscosity becomes high, thereby easily decreasing conductivity and easily causing deterioration due to charge and discharge cycle.

In order to improve noncombustibility and flame retardancy of an electrolytic solution without lowering its performance, addition of a fluorine-containing ether has been proposed (JP8-37024A, JP9-97627A, JP11-26015A, JP2000-294281A, JP2001-52737A and JP11-307123A).

JP8-37024A describes an electrolytic solution for secondary battery comprising a fluorine-containing ether and having high capacity and excellent cycle stability, and says that either of chain fluorine-containing ether and cyclic fluorine-containing ether may be used, and fluorine-containing ethers having an alkyl group having 2 or less carbon atoms at one end thereof are exemplified as examples of chain fluorine-containing ether.

However, it is disclosed that the content of fluorine-containing ether is up to 30% by volume, and when the content is larger than 30% by volume, in such a system, discharge capacity becomes small.

In order to prepare an electrolytic solution without using cyclic carbonate as a solvent for dissolving an electrolyte salt, JP9-97627A proposes using, in addition to non-cyclic carbonate, a fluorine-containing ether represented by $R^1$—O—$R^2$ ($R^1$ is an alkyl group or halogen-substituted alkyl group having 2 or less carbon atoms; $R^2$ is a halogen-substituted alkyl group having not less than two and not more than 10 carbon atoms) in an amount of more than 30% by volume and not more than 90% by volume. Also it is suggested that initial discharge capacity is improved by blending cyclic carbonate preferably in an amount of not more than 30% by volume, though blending of cyclic carbonate is not essential.

However, JP9-97627A says that in this system, when the number of carbon atoms of $R^1$ is 3 or more, solubility of an electrolyte salt is lowered, and target battery characteristics cannot be obtained.

JP11-26015A, JP2000-294281A and JP2001-52737A propose improvement in compatibility with other solvent, stability for oxidation decomposition and noncombustibility by using a fluorine-containing ether having —$CH_2$—O— as an organic group having ether linkage-formable oxygen, and concretely disclose a fluorine-containing ether such as $HCF_2CF_2CH_2OCF_2CF_2H$ having an organic group having 2 or less carbon atoms and being bonded to one end of the ether linkage-formable oxygen. However, generally its boiling point is low, compatibility with other solvent is low and in addition, solubility of an electrolyte salt is low. Therefore, this fluorine-containing ether is not necessarily enough as a solvent for an electrolytic solution for secondary battery in the case of aiming at further heat resistance and resistance to oxidation.

JP11-307123A describes that an electrolytic solution being excellent in keeping of capacity and safety can be provided by mixing a fluorine-containing ether represented by $C_mF_{2m+1}$—O—$C_nH_{2n+1}$ to chain carbonate. However, this solvent mixture system is low in capability of dissolving an electrolyte salt and cannot dissolve $LiPF_6$ and $LiBF_4$ which are excellent electrolyte salts and are generally used. As a result, $LiN(O_2SCF_3)_2$ exhibiting corrosive behavior on metal is obliged to be used as an electrolyte salt. Also, rate characteristics are inferior because of high viscosity.

As mentioned above, the present situation is such that electrolytic solutions for lithium secondary battery being excellent in noncombustibility and flame retardancy and having sufficient battery characteristics (charge and discharge cycle characteristics, discharge capacity, etc.) have not been developed.

DISCLOSURE OF INVENTION

The present invention was made aiming at solving the problems mentioned above, and it is an object of the present invention to provide an electrochemical device causing no phase separation even at low temperature and having excellent flame retardancy and heat resistance, high solubility of an electrolyte salt, large discharge capacity and excellent charge and discharge cycle characteristics.

Namely, the present invention relates to an electrochemical device provided with an electrolytic solution comprising:
(I) a solvent for dissolving an electrolyte salt comprising:
(A) a fluorine-containing ether represented by the formula (1):

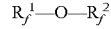

wherein $R_f^1$ and $R_f^2$ are the same or different and each is a fluorine-containing alkyl group having 3 to 6 carbon atoms,
(B) a cyclic carbonate, and
(C) a chain carbonate being compatible with both of the fluorine-containing ether (A) and the cyclic carbonate (B), and
(II) an electrolyte salt,
in which the solvent (I) for dissolving an electrolyte salt comprises 30 to 60% by volume of the fluorine-containing ether (A), 3 to 40% by volume of the cyclic carbonate (B) and 10 to 67% by volume of the chain carbonate (C) based on the whole solvent (I).

It is preferable that a fluorine content of the fluorine-containing ether (A) represented by the formula (1) is from 55 to 74% by mass, and in the formula (1), $R_f^1$ and $R_f^2$ are the same or different and each is a fluorine-containing alkyl group having 3 or 4 carbon atoms, since balance of noncombustibility with compatibility is especially satisfactory and when the number of carbon atoms is as mentioned above, it is advantageous from the viewpoint of a boiling point and rate characteristics (viscosity).

It is preferable that the above-mentioned cyclic carbonate (B) is ethylene carbonate and/or vinylene carbonate.

Particularly, the electrolytic solution, in which the solvent (I) for dissolving an electrolyte salt comprises 40 to 60% by volume of the fluorine-containing ether (A), 5 to 25% by volume of the cyclic carbonate (B) and 15 to 55% by volume of the chain carbonate (C) based on the whole solvent (I), is stable as a liquid in a concentration of electrolyte salt of not less than 0.5 mole/liter even at low temperature and at high temperature, and an electrochemical device having the electrolytic solution has excellent characteristics.

Also, it is preferable that the above-mentioned electrochemical device is a battery.

In addition, the present invention relates to an electrolytic solution comprising:
(I) a solvent for dissolving an electrolyte salt comprising:
(A) a fluorine-containing ether represented by the formula (1):

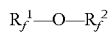

wherein $R_f^1$ and $R_f^2$ are the same or different and each is a fluorine-containing alkyl group having 3 to 6 carbon atoms,
(B) a cyclic carbonate, and
(C) a chain carbonate being compatible with both of the fluorine-containing ether (A) and the cyclic carbonate (B), and
(II) an electrolyte salt,
in which the solvent (I) for dissolving an electrolyte salt comprises 30 to 60% by volume of the fluorine-containing ether (A), 3 to 40% by volume of the cyclic carbonate (B) and 10 to 67% by volume of the chain carbonate (C) based on the whole solvent (I).

Further, the present invention relates to an electrolytic solution for a lithium secondary battery comprising:
(I) a solvent for dissolving an electrolyte salt comprising:
(A) a fluorine-containing ether represented by the formula (1a):

$$R_f^{1a}—O—R_f^{2a}$$

wherein $R_f^{1a}$ and $R_f^{2a}$ are the same or different and each is a fluorine-containing alkyl group having 3 or 4 carbon atoms,
(B) an ethylene carbonate and/or vinylene carbonate, and
(C) a chain carbonate being compatible with both of the fluorine-containing ether (A) and the ethylene carbonate and/or vinylene carbonate (B), and
(II) an electrolyte salt,
in which the solvent (I) for dissolving an electrolyte salt comprises 40 to 60% by volume of the fluorine-containing ether (A), 3 to 20% by volume of the ethylene carbonate and/or vinylene carbonate (B) and 20 to 57% by volume of the chain carbonate (C) based on the whole solvent (I), the electrolyte salt (II) is $LiPF_6$ or $LiBF_4$, and a concentration of the electrolyte salt is not less than 0.8 mole/liter.

Particularly, the electrolytic solution, in which the solvent (I) for dissolving an electrolyte salt comprises 40 to 60% by volume of the fluorine-containing ether (A), 3 to 15% by volume of the ethylene carbonate and/or vinylene carbonate (B) and 31 to 57% by volume of the chain carbonate (C) based on the whole solvent (I), has a concentration of electrolyte salt of not less than 1.0 mole/liter, and is stable as a liquid even at low temperature and at high temperature, and battery characteristics are excellent.

The fluorine-containing ether (A) having a boiling point of not less than 90° C. is excellent in stability (heat resistance) at high temperature, and $HCF_2CF_2CH_2OCF_2CFHCF_3$ is especially excellent since it has a boiling point of not less than 100° C. and satisfactory compatibility with other solvents and solubility of the electrolyte salt.

While the electrolytic solution of the present invention is excellent in flame retardancy, further in order to impart noncombustibility (non-ignition property), phosphoric ester (D), especially fluorine-containing alkylphosphoric ester may be contained in the solvent (I) for dissolving an electrolyte salt in an amount of not more than 3% by volume, further not more than 1% by volume.

Further, the present invention relates to an electrolytic solution for a lithium secondary battery comprising:
(I) a solvent for dissolving an electrolyte salt comprising:
(A) a fluorine-containing ether represented by the formula (1b):

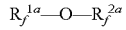

wherein $R_f^{1b}$ and $R_f^{2b}$ are the same or different and each is a fluorine-containing alkyl group having 3 to 6 carbon atoms,
(B) an ethylene carbonate and/or vinylene carbonate, and
(C) a chain carbonate being compatible with both of the fluorine-containing ether (A) and the ethylene carbonate and/or vinylene carbonate (B), and
(II) an electrolyte salt,
in which the solvent (I) for dissolving an electrolyte salt comprises 30 to 60% by volume of the fluorine-containing ether (A), 3 to 40% by volume of the ethylene carbonate and/or vinylene carbonate (B) and 10 to 67% by volume of the chain carbonate (C) based on the whole solvent (I), the electrolyte salt (II) at least comprises an electrolyte salt (IIa) selected from $LiN(SO_2CF_3)_2$ and $LiN(SO_2C_2F_5)_2$, and a concentration of the electrolyte salt (II) is not less than 0.5 mole/liter.

It is preferable that a fluorine content of the fluorine-containing ether (A) represented by the formula (1b) is not less than 55% by mass and not more than 74% by mass, and in the formula (1), $R_f^{1b}$ and $R_f^{2b}$ are the same or different and each is a fluorine-containing alkyl group having 3 or 4 carbon atoms, from the viewpoint that balance of noncombustibility with compatibility is especially satisfactory, and when the number of carbon atoms is as mentioned above, it is advantageous from the viewpoint of a boiling point and rate characteristics (viscosity).

Further, it is preferable that the electrolyte salt (II) comprises an electrolyte salt (IIb) selected from $LiPF_6$ and $LiBF_4$ in addition to the electrolyte salt (IIa), and a concentration of this electrolyte salt (IIb) is not less than 0.1 mole/liter.

It is particularly preferable that the concentration of the electrolyte salt (IIa) is from 0.4 to 1.3 mole/liter, the concentration of the electrolyte salt (IIb) is from 0.1 to 0.5 mole/liter, and a ratio of the concentration of the electrolyte salt (IIb) to (the concentration of the electrolyte salt (IIa)+the concentration of the electrolyte salt (IIb)) is not less than 0.1 and not more than 0.4. It is particularly preferable that the electrolyte salt (IIb)) is $LiPF_6$, from the viewpoint of rate characteristics. In the case where the electrolyte salt (IIa) is $LiN(SO_2CF_3)_2$, it is preferable to use it together with $LiPF_6$. In that case, it is preferable that a ratio of the concentration of $LiPF_6$ to (the concentration of $LiPF_6+LiN(SO_2CF_3)_2$) is 0.2 to 0.35, from the viewpoint of prevention of corrosion of an aluminum current collector.

Particularly, the electrolytic solution, in which the solvent (I) for dissolving an electrolyte salt comprises 40 to 60% by volume of the fluorine-containing ether (A), 5 to 25% by volume of the ethylene carbonate and/or vinylene carbonate (B) and 15 to 55% by volume of the chain carbonate (C) based on the whole solvent (I), has a concentration of electrolyte salt of not less than 0.5 mole/liter, and is stable as a liquid even at low temperature and at high temperature, and battery characteristics are excellent.

The fluorine-containing ether (A) having a boiling point of not less than 80° C. is excellent in stability (heat resistance) at high temperature, and the fluorine-containing ether (A) having a boiling point of not less than 100° C. and selected from $HCF_2CF_2CH_2OCF_2CFHCF_3$ and $CF_3CF_2CH_2OCF_2CFHCF_3$ is especially excellent from the viewpoint of satisfactory compatibility with other solvents and solubility of the electrolyte salt.

While the electrolytic solution of the present invention is excellent in flame retardancy, further in order to impart non-combustibility (non-ignition property), phosphoric ester (D), especially fluorine-containing alkylphosphoric ester may be contained in the solvent (I) for dissolving an electrolyte salt in an amount of not more than 10% by volume, further not more than 5% by volume.

In this specification, "flame retardancy" means property of not causing firing and bursting in a flame retardation test explained infra, and "noncombustibility" means property of not causing ignition in an ignition test explained infra.

BEST MODE FOR CARRYING OUT THE INVENTION

The electrochemical device of the present invention is provided with the electrolytic solution comprising the solvent (I) for dissolving an electrolyte salt having specific composition and the electrolyte salt (II).

In the first embodiment of the present invention, the electrochemical device of the present invention is provided with the electrolytic solution (a) comprising the solvent (Ia) for dissolving an electrolyte salt having specific composition and the electrolyte salt (IIa).

First, the solvent (Ia) for dissolving an electrolyte salt is explained below.

(Aa) Fluorine-Containing Ether:

Fluorine-containing ether represented by the formula (1a):

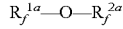

wherein $R_f^{1a}$ and $R_f^{2a}$ are the same or different and each is a fluorine-containing alkyl group having 3 or 4 carbon atoms.

Examples thereof are those, in which $R_f^{1a}$ and $R_f^{2a}$ are $HCF_2CF_2CH_2-$, $CF_3CF_2CH_2-$, $CF_3CF_2CH_2CH_2-$, $HCF_2CF_2CF_2-$, $HCF_2CF_2CF_2CF_2-$, $HCF_2CF_2CH_2CH_2-$, $CF_3CFHCF_2-$ and $CF_3CFHCF_2CH_2-$.

Particularly, $R_f^{1a}$ and $R_f^{2a}$ having $HCF_2-$ or $CF_3CFH-$ at an end thereof are excellent in polarizability and can provide a fluorine-containing ether having a high boiling point (not less than 90° C., especially not less than 100° C.). Examples of suitable fluorine-containing ether are, for instance, one kind or two or more kinds of $HCF_2CF_2CH_2OCF_2CFHCF_3$, $HCF_2CF_2CH_2OCH_2CF_2CF_2H$ and $CF_3CFHCF_2CH_2OCF_2CFHCF_3$, and $HCF_2CF_2CH_2OCF_2CFHCF_3$ (boiling point 106° C.) is preferable since it is advantageous especially from the viewpoint of a high boiling point and satisfactory compatibility with other solvents and solubility of the electrolyte salt.

The amount of the fluorine-containing ether (Aa) is 40 to 60% by volume based on the whole solvent (Ia). When the amount is too large, solubility of the electrolyte salt is lowered, and in some cases, phase separation occurs, and when the amount is too small, low temperature characteristics (stability at low temperature) are lowered, and flame retardancy is also lowered. In both cases, balance of liquid characteristics with battery characteristics is collapsed. A preferable upper limit of the amount is 55% by volume from the viewpoint of satisfactory compatibility with other solvents and solubility of the electrolyte salt, and a preferable lower limit is 45% by volume from the viewpoint of maintenance of low temperature characteristics and flame retardancy.

Not more than 50% by volume of the fluorine-containing ether (Aa) may be replaced by other fluorine-containing ether. Preferable examples of other fluorine-containing ether are, for instance, fluorine-containing chain ethers having 4 to 5 carbon atoms in total, and especially $HCF_2CF_2CH_2OCF_2CF_2H$ having a high boiling point (boiling point 93° C.) is preferable.

(Ba) Cyclic Carbonate:

There are exemplified non-fluorine-containing cyclic carbonates and fluorine-containing cyclic carbonates as the cyclic carbonate (Ba).

Among non-fluorine-containing cyclic carbonates, ethylene carbonate and/or vinylene carbonate have a high dielectric constant and especially excellent solubility of the electrolyte salt and are preferable for the electrolytic solution of the present invention. In the case where graphite-based material is used on a negative electrode, a stable coating film can be formed on the negative electrode.

The amount of the cyclic carbonate (Ba) is 3 to 20% by volume based on the whole solvent (Ia). In the system of the solvent (Ia) used in the present invention, when the amount of the cyclic carbonate (Ba) is too large, the fluorine-containing ether (Aa) causes phase separation under low temperature atmosphere (for example, −30° C. to −20° C.), i.e. at an outside air temperature in wintertime and at a temperature in a chamber of a refrigerator. From this point of view, a preferable upper limit of the amount is 15% by volume, further 9% by volume. On the contrary, when the amount of the cyclic carbonate (Ba) is too small, solubility of the electrolyte salt (IIa) in the solvent is lowered, and a desired concentration of the electrolyte salt (not less than 0.8 mole/liter) cannot be achieved.

It is preferable to mix the cyclic carbonate (Ba) in an amount equal to or smaller than the amount of the chain carbonate (Ca). When the amount of the cyclic carbonate (Ba) is larger than that of the chain carbonate (Ca), there is a tendency that compatibility between the solvents is lowered. When the cyclic carbonate (Ba) is mixed in an amount equal to or smaller than the amount of the chain carbonate (Ca), a homogeneous electrolytic solution can be prepared in a wide temperature range, and cycle characteristics are also improved.

(Ca) Chain Carbonate being Compatible with Both of the Fluorine-Containing Ether (Aa) and the Cyclic Carbonate (Ba):

Since compatibility of the fluorine-containing ether (Aa) with the cyclic carbonate (Ba) is low, a homogeneous solvent mixture is hardly formed only by them. Accordingly, the chain carbonate (Ca) being compatible with both of the fluorine-containing ether (Aa) and the cyclic carbonate (Ba) is mixed.

Examples of the chain carbonate (Ca) are, for instance, one kind or two or more kinds of hydrocarbon chain carbonates such as diethyl carbonate, ethyl methyl carbonate and dimethyl carbonate; and fluorine-containing hydrocarbon chain carbonates such as $CF_3CH_2OCOOCH_2CF_3$, $CF_3CH_2OCOOCH_3$, $CF_3CF_2CH_2OCOOCH_3$ and $HCF_2CF_2CH_2OCOOCH_3$. From the viewpoint of a high boiling point, low viscosity and satisfactory low temperature characteristics, diethyl carbonate, ethyl methyl carbonate, dimethyl carbonate, $CF_3CH_2OCOOCH_2CF_3$, $CF_3CH_2OCOOCH_3$, $CF_3CF_2CH_2OCOOCH_3$ and $HCF_2CF_2CH_2OCOOCH_3$ are preferable, and diethyl carbonate and ethyl methyl carbonate are preferable especially from the viewpoint of satisfactory low temperature characteristics.

The amount of the chain carbonate (Ca) is 20 to 57% by volume based on the whole solvent (Ia). The amount is preferably 31 to 57% by volume from the viewpoint of satisfactory compatibility with other solvents and solubility of the electrolyte salt.

(Da) Phosphoric Ester

The phosphoric ester (Da) may be mixed to impart non-combustibility (non-ignition property). Ignition can be prevented by mixing the phosphoric ester in an amount of not more than 3% by volume in the solvent (Ia) for dissolving an electrolyte salt.

Examples of the phosphoric ester (Da) are fluorine-containing alkylphosphoric ester, non-fluorine-containing alkylphosphoric ester and arylphosphoric ester, and fluorine-containing alkylphosphoric ester is preferable since it highly contributes to make the electrolytic solution nonflammable and an effect of making the electrolytic solution nonflammable is increased even in a small amount.

Examples of the fluorine-containing alkylphosphoric ester are fluorine-containing dialkylphosphoric ester disclosed in JP11-233141A, cyclic alkylphosphoric ester disclosed in JP11-283669A, and fluorine-containing trialkylphosphoric ester (D1a) represented by the formula (D1a):

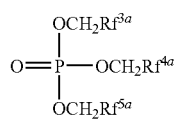

(D1a)

wherein $Rf^{3a}$, $Rf^{4a}$ and $Rf^{5a}$ are the same or different, and each is a fluorine-containing alkyl group having 1 to 3 carbon atoms.

Since the fluorine-containing trialkylphosphoric ester (D1a) has high capability of giving noncombustibility and satisfactory compatibility with the components (Aa), (Ba) and (Ca), its amount can be decreased, and even when its amount is not more than 2% by volume, further not more than 1% by volume, ignition can be prevented.

Preferable examples of the fluorine-containing trialkylphosphoric esters (D1a) are those, in which in the formula (D1a), $Rf^{3a}$, $Rf^{4a}$ and $Rf^{5a}$ are the same or different, and each is $CF_3$—, $CF_3CF_2$—, $CF_3CH_2$—, $HCF_2CF_2$— or $CF_3CFHCF_2$—. Especially, tri-2,2,3,3,3-pentafluoropropyl phosphate, in which any of $Rf^{3a}$, $Rf^{4a}$ and $Rf^{5a}$ are $CF_3CF_2$—, and tri-2,2,3,3-tetrafluoropropyl phosphate, in which any of $Rf^{3a}$, $Rf^{4a}$ and $Rf^{5a}$ are $HCF_2CF_2$—, are preferable.

(Ea) Other Additives

In the present invention, other additives such as an additive for increasing dielectric constant and cycle characteristics improver may be mixed without deviation from the specified volume percentages of the components (Aa), (Ba), (Ca) and if necessary, (Da) to an extent not to impair the effect of the present invention.

Examples of an additive for increasing dielectric constant are, for instance, propylene carbonate, butylene carbonate, vinylethylene carbonate, sulfolane, methyl sulfolane, γ-butyrolactone, γ-valerolactone, acetonitrile and propionitrile.

Examples of an over-charging inhibitor are, for instance, hexafluorobenzene, fluorobenzene, cyclohexylbenzene, dichloroaniline and toluene.

For improving capacity property and rate characteristics, fluorine-containing esters such as $HCF_2COOCH_3$, $HCF_2COOC_2H_5$, $CF_3COOCH_3$, $CF_3COOC_2H_5$, $C_2F_5COOCH_3$ and $HCF_2CF_2COOCH_3$ are preferable.

Also there are exemplified, as additives exhibiting the same effects as above, fluorine-containing carboxylates represented by the formula (Ea1):

$$Rf^{6a}COO^-M^+$$

wherein $Rf^{6a}$ is a fluorine-containing alkyl group having 1 to 8 carbon atoms, $M^+$ is a monovalent metal cation or $NH_4^+$, preferably alkali metal cation, and fluorine-containing sulfonates represented by the formula (Ea2):

$$Rf^{7a}SO_3^-M^+$$

wherein $Rf^{7a}$ is a fluorine-containing alkyl group having 1 to 8 carbon atoms, $M^+$ is a monovalent metal cation or $NH_4^+$, preferably alkali metal cation.

Examples of fluorine-containing carboxylates satisfying the formula (Ea1) are, for instance, $H(CF_2)_4COO^-Li^+$, $C_4F_9COO^-Li^+$, $C_5F_{11}COO^-Li^+$, $C_6F_{13}COO^-Li^+$, $C_7F_{15}COO^-Li^+$ and $C_8F_{17}COO^-Li^+$. Examples of fluorine-containing sulfonates satisfying the formula (Ea2) are, for instance, $C_4F_9SO_3^-Li^+$, $C_6F_{13}SO_3^-Li^+$ and $C_8F_{17}SO_3^-Li^+$.

The solvent (Ia) for dissolving an electrolyte salt can be prepared by mixing and homogeneously dissolving the components (Aa), (Ba), (Ca) and if necessary, the component (Da) and the component (Ea).

Next, the electrolyte salt (IIa) is explained below. In the present invention, the electrolyte salt used for the electrolytic solution (a) is $LiPF_6$ or $LiBF_4$ used on many electrochemical devices such as lithium secondary battery.

In order to secure practical performance of secondary battery, it is demanded that the concentration of the electrolyte salt is not less than 0.8 mole/liter, further not less than 1.0 mole/liter. The solvent (Ia) for dissolving an electrolyte salt which is used in the present invention has capability of dissolving $LiPF_6$ or $LiBF_4$ at a concentration satisfying such a demand.

Next, a preferable formulation of the electrolytic solution (a) of the electrochemical device in the first embodiment of the present invention is specifically mentioned below, but the present invention is not limited thereto.

(Formulation a)
(Ia) Solvent for Dissolving an Electrolyte Salt
(Aa) Fluorine-Containing Ether
  Kind: $HCF_2CF_2CH_2OCF_2CFHCF_3$
  Amount: 40 to 60% by volume (amount in the solvent (Ia), hereinafter the same)
(Ba) Cyclic Carbonate
  Kind: Ethylene carbonate and/or vinylene carbonate
  Amount: 3 to 15% by volume
(Ca) Chain Carbonate
  Kind: Diethyl carbonate or ethyl methyl carbonate
  Amount: 31 to 57% by volume (Da) Phosphoric Ester
Kind: Fluorine-containing alkylphosphoric ester
Amount: 0 to 3% by volume
(IIa) Electrolyte Salt
Kind: LiPF$_6$ or LiBF$_4$
Concentration: 0.8 to 1.2 mole/liter In the second embodiment of the present invention, the electrochemical device of the present invention is provided with the electrolytic solution (b) comprising the solvent (Ib) for dissolving an electrolyte salt and the electrolyte salt (IIb).

First, the solvent (Ib) for dissolving an electrolyte salt is explained below.

(Ab) Fluorine-Containing Ether:
Fluorine-containing ether represented by the formula (Ib):

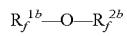

$$R_f^{1b}\text{—O—}R_f^{2b}$$

wherein $R_f^{1b}$ and $R_f^{2b}$ are the same or different and each is a fluorine-containing alkyl group having 3 to 6, preferably 3 or 4 carbon atoms.

When the number of carbon atoms of $R_f^{1b}$ and $R_f^{2b}$ is less than 3, the boiling point of the fluorine-containing ether becomes too low, and when the number of carbon atoms thereof exceeds 6, solubility of the electrolyte salt is lowered, an adverse effect on its compatibility with other solvents appears and viscosity is increased, thereby lowering rate characteristics. Especially, the number of carbon atoms of 3 or 4 is advantageous from the viewpoint of a boiling point and rate characteristics (viscosity).

Since $R_f^{1b}$ and $R_f^{2b}$ have fluorine atom, noncombustibility of the electrolytic solution (b) comprising this fluorine-containing ether (Ab) is improved.

Further preferably, the fluorine content of the fluorine-containing ether (Ab) is preferably not less than 55% by mass, further preferably not less than 60% by mass, especially preferably not less than 65% by mass, and an upper limit thereof is preferably 74% by mass, further preferably 70% by mass. When the fluorine content is within this range, especially excellent balance of noncombustibility with compatibility is obtained. The fluorine content is a value calculated by {(the number of fluorine atoms×19)/molecular weight}×100(%).

There are specifically exemplified fluorine-containing ethers having $R_f^{1b}$ and $R_f^{2b}$ of HCF$_2$CF$_2$CH$_2$—, CF$_3$CF$_2$CH$_2$—, CF$_3$CF$_2$CH$_2$CH$_2$—, HCF$_2$CF$_2$CF$_2$—, HCF$_2$CF$_2$CF$_2$—, HCF$_2$CF$_2$CH$_2$CH$_2$—, CF$_3$CFHCF$_2$—, CF$_3$CFHCF$_2$CH$_2$—, HCF$_2$CF$_2$CF$_2$CH$_2$—, and HCF$_2$CF(CF$_3$)CH$_2$—.

Particularly, one having HCF$_2$— or CF$_3$CFH— at its end gives fluorine-containing ether being excellent in polarizability and having a high boiling point (not less than 90° C., especially not less than 100° C.). Examples of suitable fluorine-containing ether are, for instance, one kind or two more kinds of HCF$_2$CF$_2$CH$_2$OCF$_2$CFHCF$_3$, HCF$_2$CF$_2$CH$_2$OCH$_2$CF$_2$CF$_2$H, CF$_3$CFHCF$_2$CH$_2$OCF$_2$CFHCF$_3$ and CF$_3$CF$_2$CH$_2$OCF$_2$CFHCF$_3$, and HCF$_2$CF$_2$CH$_2$OCF$_2$CFHCF$_3$ (boiling point 106° C.) and CF$_3$CF$_2$CH$_2$OCF$_2$CFHCF$_3$ (boiling point 82° C.) are preferable because they are advantageous especially from the viewpoint of high boiling point, satisfactory compatibility with other solvents and good solubility of the electrolyte salt.

The amount of the fluorine-containing ether (Ab) is 30 to 60% by volume, preferably 40 to 60% by volume based on the whole solvent (Ib). When the amount is too large, solubility of the electrolyte salt is lowered, and in some cases, phase separation occurs, and when the amount is too small, low temperature characteristics (stability at low temperature) are lowered, and flame retardancy is lowered. In both cases, balance of liquid characteristics with battery characteristics is collapsed. A preferable upper limit of the amount is 55% by volume from the viewpoint of satisfactory compatibility with other solvents and solubility of the electrolyte salt, and a preferable lower limit is 40% by volume from the viewpoint of maintenance of low temperature characteristics and flame retardancy.

Not more than 50% by volume of the fluorine-containing ether (Ab) may be replaced by other fluorine-containing ether. Preferable examples of other fluorine-containing ether are, for instance, fluorine-containing chain ethers having 4 to 5 carbon atoms in total, and especially HCF$_2$CF$_2$CH$_2$OCF$_2$CF$_2$H having a high boiling point (boiling point 93° C.) is preferable.

(Bb) Cyclic Carbonate:
There are exemplified non-fluorine-containing cyclic carbonates and fluorine-containing cyclic carbonates as the cyclic carbonate (Bb).

Among non-fluorine-containing cyclic carbonates, ethylene carbonate and/or vinylene carbonate have a high dielectric constant and especially excellent solubility of the electrolyte salt and are preferable for the electrolytic solution of the present invention. In the case where graphite-based material is used on a negative electrode, a stable coating film can be formed on the negative electrode.

The amount of the cyclic carbonate (Bb) is 3 to 40% by volume based on the whole solvent (Ib). In the system of the solvent (Ib) used in the present invention, when the amount of the cyclic carbonate (Bb) is too large, the fluorine-containing ether (Ab) causes phase separation or is solidified under low temperature atmosphere (for example, −30° C. to −20° C.), i.e. at an outside air temperature in wintertime and at a temperature in a chamber of a refrigerator. From this point of view, a preferable upper limit of the amount is 30% by volume, further 25% by volume. On the contrary, when the amount of the cyclic carbonate is too small, solubility of the electrolyte salt (IIb) in the solvent is lowered, and a desired concentration of the electrolyte (not less than 0.8 mole/liter) cannot be achieved. A preferable lower limit is 5% by volume.

It is more preferable to mix the cyclic carbonate (Bb) in an amount equal to or smaller than the amount of the chain carbonate (Cb). When the amount of the cyclic carbonate (Bb) is larger than that of the chain carbonate (Cb), compatibility between the solvents is lowered. When the cyclic carbonate (Bb) is mixed in an amount equal to or smaller than the amount of the chain carbonate (Cb), a homogeneous electrolytic solution can be obtained in a wide temperature range, and cycle characteristics are also improved.

(Cb) Chain Carbonate being Compatible with Both of the Fluorine-Containing Ether (Ab) and the Cyclic Carbonate (Bb):

Since compatibility of the fluorine-containing ether (Ab) with the cyclic carbonate (Bb) is low, a homogeneous solvent mixture is hardly formed only by them. Accordingly, the chain carbonate (Cb) being compatible with both of the fluorine-containing ether (Ab) and the cyclic carbonate (Bb) is mixed.

Examples of the chain carbonate (Cb) are, for instance, one kind or two or more kinds of hydrocarbon chain carbonates such as diethyl carbonate, ethyl methyl carbonate, dimethyl carbonate and methyl propyl carbonate; and fluorine-containing hydrocarbon chain carbonates such as CF$_3$CH$_2$OCOOCH$_2$CF$_3$, CF$_3$CH$_2$OCOOCH$_3$ and CF$_3$CF$_2$CH$_2$OCOOCH$_3$. From the viewpoint of a high boiling point, low viscosity and satisfactory low temperature characteristics, diethyl carbonate, ethyl methyl carbonate, dimethyl carbonate, $CF_3CH_2OCOOCH_2CF_3$, $CF_3CH_2OCOOCH_3$ and $CF_3CF_2CH_2OCOOCH_3$ are preferable, and especially dimethyl carbonate and ethyl methyl carbonate are preferable from the viewpoint of satisfactory low temperature characteristics.

The amount of the chain carbonate (Cb) is 10 to 67% by volume based on the whole solvent (Ib). A preferable lower limit is 15% by volume, further preferably 20% by volume, and a preferable upper limit is 57% by volume, further preferably 55% by volume. The amount is preferably 15 to 55% by volume from the viewpoint of satisfactory compatibility with other solvents and solubility of the electrolyte salt.

(Db) Phosphoric Ester

The phosphoric ester (Db) may be mixed to impart non-combustibility (non-ignition property). Ignition can be prevented by mixing the phosphoric ester in an amount of not more than 10% by volume, preferably not more than 5% by volume in the solvent (Ib) for dissolving an electrolyte salt.

Examples of the phosphoric ester (Db) are fluorine-containing alkylphosphoric ester, non-fluorine-containing alkylphosphoric ester and arylphosphoric ester, and fluorine-containing alkylphosphoric ester is preferable since it highly contributes to make the electrolytic solution nonflammable and an effect of making the electrolytic solution nonflammable is increased even in a small amount.

Examples of the fluorine-containing alkylphosphoric ester are fluorine-containing dialkylphosphoric ester disclosed in JP11-233141A, cyclic alkylphosphoric ester disclosed in JP11-283669A, and fluorine-containing trialkylphosphoric ester (D1b) represented by the formula (D1b):

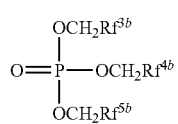

(D1b)

wherein $Rf^{3b}$, $Rf^{4b}$ and $Rf^{5b}$ are the same or different, and each is a fluorine-containing alkyl group having 1 to 3 carbon atoms.

Since the fluorine-containing trialkylphosphoric ester (D1b) has high capability of giving noncombustibility and satisfactory compatibility with the components (Ab), (Bb) and (Cb), its amount can be decreased, and even when its mount is not more than 2% by volume, further not more than 1% by volume, ignition can be prevented.

Preferable examples of the fluorine-containing trialkylphosphoric esters (D1b) are those, in which in the formula (D1b), $Rf^{3b}$, $Rf^{4b}$ and $Rf^{5b}$ are the same or different, and each is $CF_3-$, $CF_3CF_2-$, $CF_3CH_2-$, $HCF_2CF_2-$ or $CF_3CFHCF_2-$. Especially, tri-2,2,3,3,3-pentafluoropropyl phosphate, in which any of $Rf^{3b}$, $Rf^{4b}$ and $Rf^{5b}$ are $CF_3CF_2-$, and tri-2,2,3,3-tetrafluoropropyl phosphate, in which any of $Rf^{3b}$, $Rf^{4b}$ and $Rf^{5b}$ are $HCF_2CF_2-$, are preferable.

(Eb) Other additives

In the present invention, other additives such as an additive for increasing dielectric constant, cycle characteristics and rate characteristics improver and an over-charging inhibitor may be mixed without deviation from the specified volume percentages of the components (Ab), (Bb), (Cb) and if necessary, (Db) to an extent not to impair the effect of the present invention.

Examples of an additive for increasing dielectric constant are, for instance, propylene carbonate, butylene carbonate, vinylethylene carbonate, sulfolane, methyl sulfolane, γ-butyrolactone, γ-valerolactone, acetonitrile and propionitrile.

Examples of an over-charging inhibitor are, for instance, hexafluorobenzene, fluorobenzene, cyclohexylbenzene, dichloroaniline and toluene.

Examples of a cycle characteristics and rate characteristics improver are methyl acetate, ethyl acetate, tetrahydrofuran and 1,4-dioxane.

For improving capacitive characteristics and rate characteristics, fluorine-containing esters such as $HCF_2COOCH_3$, $HCF_2COOC_2H_5$, $CF_3COOCH_3$, $CF_3COOC_2H_5$, $C_2F_5COOCH_3$ and $HCF_2CF_2COOCH_3$ are preferable.

Also there are exemplified, as additives exhibiting the same effects as above, fluorine-containing carboxylates represented by the formula (Eb1):

wherein $Rf^{6b}$ is a fluorine-containing alkyl group having 1 to 8 carbon atoms, $M^+$ is a monovalent metal cation or $NH_4^+$, preferably alkali metal cation, and fluorine-containing sulfonates represented by the formula (Eb2):

wherein $Rf^{7a}$ is a fluorine-containing alkyl group having 1 to 8 carbon atoms, $M^+$ is a monovalent metal cation or $NH_4^+$, preferably alkali metal cation.

Examples of fluorine-containing carboxylates satisfying the formula (Eb1) are, for instance, $H(CF_2)_4COO^-Li^+$, $C_4F_9COO^-Li^+$, $C_5F_{11}COO^-Li^+$, $C_6F_{13}COO^-Li^+$, $C_7F_{15}COO^-Li^+$ and $C_8F_{17}COO^-Li^+$. Examples of fluorine-containing sulfonates satisfying the formula (Eb2) are, for instance, $C_4F_9SO_3^-Li^+$, $C_6F_{13}SO_3^-Li^+$ and $C_8F_{17}SO_3^-Li^+$.

The solvent (Ib) for dissolving an electrolyte salt can be prepared by mixing and homogeneously dissolving the components (Ab), (Bb), (Cb) and if necessary, the component (Db) and the component (Eb).

Next, the electrolyte salt (IIb) is explained below. In the present invention, the electrolyte salt (IIb) used for the electrolytic solution (b) at least comprises an electrolyte salt (IIb-1) selected from $LiN(SO_2CF_3)_2$ and $LiN(SO_2C_2F_5)_2$.

In the electrolytic solution of the present invention, the concentration of the electrolyte salt (IIb) is not less than 0.5 mole/liter, preferably not less than 0.6 mole/liter, further not less than 0.8 mole/liter. An upper limit is usually 1.5 mole/liter.

The electrolyte salt (IIb-1) is excellent in electrolyte salt dissociation property, especially solubility in the fluorine-containing ether (Ab), and its concentration in the electrolytic solution (b) is not less than 0.4 mole/liter, preferably not less than 0.5 mole/liter, further preferably not less than 0.6 mole/liter. When this electrolyte salt (IIb-1) is contained, ionic conductivity of the electrolytic solution (b) can be improved. An upper limit is usually 1.3 mole/liter.

In the present invention, the electrolyte salt (IIb-1) may be blended alone, and when it is used together with an electrolyte salt (IIb-2) selected from $LiPF_6$ and $LiBF_4$, further, an effect of preventing corrosion of an aluminum current collector and metal of cell material can be obtained. In the case of using the both together, the concentration of the electrolyte salt (IIb-2) is not less than 0.1 mole/liter, preferably not less than 0.15 mole/liter, further preferably not less than 0.2 mole/liter.

Further, in the case of using the both together, it is preferable that the concentration of the electrolyte salt (IIb-1) is 0.4 to 1.3 mole/liter, further 0.5 to 1.2 mole/liter, the concentration of the electrolyte salt (IIb-2) is 0.1 to 0.5 mole/liter, further 0.15 to 0.4 mole/liter, and a ratio of the concentration of the electrolyte salt (IIb-2) to (the concentration of the electrolyte salt (IIb-1)+the concentration of the electrolyte salt (IIb-2)) is not less than 0.1 and not more than 0.4, further not less than 0.15 and not more than 0.35, since improvement can be obtained in cycle characteristics, coulomb efficiency and ionic conductivity, on the basis of prevention of corrosion of metal.

Next, a preferable formulation of the electrolytic solution (b) used on the electrochemical device in the second embodiment of the present invention is mentioned below, but the present invention is not limited thereto.

(Formulation b1)
(Ib) Solvent for dissolving an electrolyte salt
  (Ab) Fluorine-containing ether
    Kind: $HCF_2CF_2CH_2OCF_2CFHCF_3$ or $CF_3CF_2CH_2OCF_2CFHCF_3$
    Amount: 30 to 60% by volume (amount in the solvent (I), hereinafter the same)
    Fluorine content: 65 to 70% by mass
  (Bb) Cyclic carbonate
    Ethylene carbonate and/or vinylene carbonate
    Amount: 3 to 40% by volume
  (Cb) Chain carbonate
    Kind: Diethyl carbonate or ethyl methyl carbonate
    Amount: 10 to 67% by volume
  (Db) Phosphoric ester
    Kind: Fluorine-containing alkylphosphoric ester
    Amount: 0 to 10% by volume
(IIb) Electrolyte salt
  Electrolyte salt (IIb-1)
    Kind: $LiN(SO_2CF_3)_2$ or $LiN(SO_2CF_2CF_3)_2$
    Concentration: 0.5 to 1.3 mole/liter (Formulation b2)
(Ib) Solvent for dissolving an electrolyte salt
  (Ab) Fluorine-containing ether
    Kind: $HCF_2CF_2CH_2OCF_2CFHCF_3$ or $CF_3CF_2CH_2OCF_2CFHCF_3$
    Amount: 30 to 60% by volume
    Fluorine content: 65 to 70% by mass
  (Bb) Cyclic carbonate
    Ethylene carbonate and/or vinylene carbonate
    Amount: 3 to 40% by volume
  (Cb) Chain carbonate
    Kind: Diethyl carbonate or ethyl methyl carbonate
    Amount: 10 to 67% by volume
  (Db) Phosphoric ester
    Kind: Fluorine-containing alkylphosphoric ester
    Amount: 0 to 10% by volume
(IIb) Electrolyte salt
  Electrolyte salt (IIb-1)
    Kind: $LiN(SO_2CF_3)_2$ or $LiN(SO_2CF_2CF_3)_2$
    Concentration: 0.4 to 1.3 mole/liter
  Electrolyte salt (IIb-2)
    Kind: $LiPF_6$ or $LiBF_4$
    Concentration: 0.1 to 0.5 mole/liter
  (IIb-2)/{(IIb-1)+(IIb-2)}: 0.1 to 0.4

Examples of electrochemical devices provided with the electrolytic solution (a) or the electrolytic solution (b) explained above are, for instance, electrolytic capacitor, electrical double layer capacitor, batteries charged/discharged by charge-transfer of ion, solid display element such as electroluminescent device, and sensors such as current sensor and gas sensor.

Suitable example is a lithium secondary battery comprising a positive electrode, a negative electrode, a separator and the electrolytic solution (a) or the electrolytic solution (b), and it is especially preferable that an active material used on a positive electrode is at least one kind selected from the group consisting of cobalt compound oxides, nickel compound oxides, manganese compound oxides, iron compound oxides and vanadium compound oxides since a high-powered secondary battery having high energy density is obtained.

Example of cobalt compound oxide is $LiCoO_2$, example of nickel compound oxide is $LiNiO_2$, and example of manganese compound oxide is $LiMnO_2$. Also there may be used compound oxides of CoNi, CoMn, NiMn and NiCoMn represented by $LiCo_xNi_{1-x}O_2$ ($0<x<1$), $LiCo_xMn_{1-x}O_2$ ($0<x<1$), $LiNi_xMn_{1-x}O_2$ ($0<x<1$), $LiNi_xMn_{2-x}O_4$ ($0<x<2$) and $LiNi_{1-x-y}Co_xMn_yO_2$ ($0<x<1$, $0<y<1$, $0<x+y<1$). In these lithium-containing compound oxides, a part of metal elements such as Co, Ni and Mn may be replaced by at least one kind of metal element such as Mg, Al, Zr, Ti or Cr.

Examples of iron compound oxide are, for instance, $LiFeO_2$ and $LiFePO_4$, and example of vanadium compound oxide is $V_2O_5$.

Among the above-mentioned compound oxides, nickel compound oxide or cobalt compound oxide is preferable as an active material for a positive electrode from the viewpoint that capacity can be made high. Especially in a small lithium secondary battery, the use of cobalt compound oxide is desirable from the viewpoint of high energy density and safety.

In the present invention, especially for the uses on large size lithium secondary batteries for hybrid cars and distributed power source, since high output is demanded, it is preferable that particles of an active material for a positive electrode mainly comprise secondary particles, and an average particle size of secondary particles is not more than 40 µm and fine particles having an average primary particle size of not more than 1 µm are contained in an amount of 0.5 to 7.0% by volume.

When fine particles having an average primary particle size of not more than 1 µm are contained, an area thereof coming into contact with an electrolytic solution is increased and lithium ion can be scattered more rapidly between the electrode and the electrolytic solution, thereby enabling output performance to be improved.

Examples of an active material to be used on a negative electrode in the present invention are carbon materials, and in addition, metallic oxides and metallic nitrides to which lithium ion can be inserted. Examples of carbon materials are natural graphite, artificial graphite, pyrocarbon, coke, mesocarbon microbeads, carbon fiber, activated carbon and pitch-coated graphite. Examples of metallic oxides to which lithium ion can be inserted are tin- or silicon-containing metallic compounds, for example, tin oxide and silicon oxide, and examples of metallic nitrides are $Li_{2.6}Co_{0.4}N$, etc.

A separator which can be used in the present invention is not limited particularly, and there are exemplified microporous polyethylene film, microporous polypropylene film, microporous ethylene-propylene copolymer film, microporous polypropylene/polyethylene two-layer film, microporous polypropylene/polyethylene/polypropylene three-layer film, etc.

The electrolytic solution (a) and the electrolytic solution (b) used in the present invention are nonflammable, and therefore, are useful especially as an electrolytic solution for the above-mentioned large size lithium secondary batteries for hybrid cars and distributed power source, and in addition, are useful as a non-aqueous electrolytic solution for small size lithium secondary batteries.

EXAMPLE

The first embodiment of the present invention is then explained by means of examples, but the present invention is not limited to them.

Compounds used in the following examples and comparative examples are as follows.

Component (Aa)
 (Aa): $HCF_2CF_2CH_2OCF_2CFHCF_3$
Component (Ba)
 (Ba-1): Ethylene carbonate
 (Ba-2): Vinylene carbonate
Component (Ca)
 (Ca): Diethyl carbonate
Component (Da)
 (Da): Tri-2,2,3,3,3-pentafluoropropyl phosphate
Electrolyte salt (IIa)
 (IIa-1): $LiPF_6$
 (IIa-2): $LiBF_4$

Example 1

$HCF_2CF_2CH_2OCF_2CFHCF_3$ (Aa), ethylene carbonate (Ba-1) and diethyl carbonate (Ca) were mixed in a % by volume ratio of 50/3/47 to prepare a solvent for dissolving an electrolyte salt, and to this solvent for dissolving an electrolyte salt was added $LiPF_6$ (IIa-1) to give a concentration of 1.0 mole/liter, followed by sufficiently stirring at 25° C. to prepare the electrolytic solution of the present invention.

Example 2

$HCF_2CF_2CH_2OCF_2CFHCF_3$ (Aa), ethylene carbonate (Ba-1) and diethyl carbonate (Ca) were mixed in a % by volume ratio of 50/10/40 to prepare a solvent for dissolving an electrolyte salt, and to this solvent for dissolving an electrolyte salt was added $LiPF_6$ (IIa-1) to give a concentration of 1.0 mole/liter, followed by sufficiently stirring at 25° C. to prepare the electrolytic solution of the present invention.

Example 3

$HCF_2CF_2CH_2OCF_2CFHCF_3$ (Aa), ethylene carbonate (Ba-1) and diethyl carbonate (Ca) were mixed in a % by volume ratio of 50/3/47 to prepare a solvent for dissolving an electrolyte salt, and to this solvent for dissolving an electrolyte salt was added $LiBF_4$ (IIa-2) to give a concentration of 1.0 mole/liter, followed by sufficiently stirring at 25° C. to prepare the electrolytic solution of the present invention.

Example 4

$HCF_2CF_2CH_2OCF_2CFHCF_3$ (Aa), ethylene carbonate (Ba-1), diethyl carbonate (Ca) and tri-2,2,3,3,3-pentafluoropropyl phosphate (Da) were mixed in a % by volume ratio of 50/3/45/2 to prepare a solvent for dissolving an electrolyte salt, and to this solvent for dissolving an electrolyte salt was added $LiPF_6$ (IIa-1) to give a concentration of 1.0 mole/liter, followed by sufficiently stirring at 25° C. to prepare the electrolytic solution of the present invention.

Example 5

$HCF_2CF_2CH_2OCF_2CFHCF_3$ (Aa), ethylene carbonate (Ba-1) and diethyl carbonate (Ca) were mixed in a % by volume ratio of 60/5/35 to prepare a solvent for dissolving an electrolyte salt, and to this solvent for dissolving an electrolyte salt was added $LiPF_6$ (IIa-1) to give a concentration of 1.0 mole/liter, followed by sufficiently stirring at 25° C. to prepare the electrolytic solution of the present invention.

Example 6

$HCF_2CF_2CH_2OCF_2CFHCF_3$ (Aa), ethylene carbonate (Ba-1) and diethyl carbonate (Ca) were mixed in a % by volume ratio of 40/20/40 to prepare a solvent for dissolving an electrolyte salt, and to this solvent for dissolving an electrolyte salt was added $LiPF_6$ (IIa-1) to give a concentration of 1.0 mole/liter, followed by sufficiently stirring at 25° C. to prepare the electrolytic solution of the present invention.

Example 7

$HCF_2CF_2CH_2OCF_2CFHCF_3$ (Aa), ethylene carbonate (Ba-1) and diethyl carbonate (Ca) were mixed in a % by volume ratio of 40/15/45 to prepare a solvent for dissolving an electrolyte salt, and to this solvent for dissolving an electrolyte salt was added $LiPF_6$ (IIa-1) to give a concentration of 1.0 mole/liter, followed by sufficiently stirring at 25° C. to prepare the electrolytic solution of the present invention.

Example 8

$HCF_2CF_2CH_2OCF_2CFHCF_3$ (Aa), ethylene carbonate (Ba-1) and diethyl carbonate (Ca) were mixed in a % by volume ratio of 55/7/38 to prepare a solvent for dissolving an electrolyte salt, and to this solvent for dissolving an electrolyte salt was added $LiPF_6$ (IIa-1) to give a concentration of 1.0 mole/liter, followed by sufficiently stirring at 25° C. to prepare the electrolytic solution of the present invention.

Example 9

$HCF_2CF_2CH_2OCF_2CFHCF_3$ (Aa), vinylene carbonate (Ba-2) and diethyl carbonate (Ca) were mixed in a % by volume ratio of 50/3/47 to prepare a solvent for dissolving an electrolyte salt, and to this solvent for dissolving an electrolyte salt was added $LiPF_6$ (IIa-1) to give a concentration of 1.0 mole/liter, followed by sufficiently stirring at 25° C. to prepare the electrolytic solution of the present invention.

Example 10

$HCF_2CF_2CH_2OCF_2CFHCF_3$ (Aa), vinylene carbonate (Ba-2) and diethyl carbonate (Ca) were mixed in a % by volume ratio of 50/10/40 to prepare a solvent for dissolving an electrolyte salt, and to this solvent for dissolving an electrolyte salt was added $LiPF_6$ (IIa-1) to give a concentration of 1.0 mole/liter, followed by sufficiently stirring at 25° C. to prepare the electrolytic solution of the present invention.

Comparative Example 1

Ethylene carbonate (Ba-1) and diethyl carbonate were mixed in a % by volume ratio of 10/90 to prepare a solvent for dissolving an electrolyte salt, and to this solvent for dissolving an electrolyte salt was added $LiPF_6$ (IIa-1) to give a concentration of 1.0 mole/liter, followed by sufficiently stirring at 25° C. to prepare an electrolytic solution for comparison.

Comparative Example 2

$HCF_2CF_2CH_2OCF_2CFHCF_3$ (Aa), ethylene carbonate (Ba-1) and diethyl carbonate (Ca) were mixed in a % by volume ratio of 50/1/49 to prepare a solvent for dissolving an electrolyte salt, and to this solvent for dissolving an electrolyte salt was added $LiPF_6$ (IIa-1) to give a concentration of 1.0 mole/liter, followed by sufficiently stirring at 25° C. to prepare an electrolytic solution for comparison.

Comparative Example 3

$HCF_2CF_2CH_2OCF_2CFHCF_3$ (Aa), ethylene carbonate (Ba-1) and diethyl carbonate (Ca) were mixed in a % by volume ratio of 70/10/20 to prepare a solvent for dissolving an electrolyte salt, and to this solvent for dissolving an electrolyte salt was added LiPF$_6$ (IIa-1) to give a concentration of 1.0 mole/liter, followed by sufficiently stirring at 25° C. to prepare an electrolytic solution for comparison.

Comparative Example 4

HCF$_2$CF$_2$CH$_2$OCF$_2$CFHCF$_3$ (Aa) and diethyl carbonate (Ca) were mixed in a % by volume ratio of 50/50 to prepare a solvent for dissolving an electrolyte salt, and to this solvent for dissolving an electrolyte salt was added LiPF$_6$ (IIa-1) to give a concentration of 1.0 mole/liter, followed by sufficiently stirring at 25° C. to prepare an electrolytic solution for comparison.

Comparative Example 5

HCF$_2$CF$_2$CH$_2$OCF$_2$CFHCF$_3$ (Aa), ethylene carbonate (Ba-1) and diethyl carbonate (Ca) were mixed in a % by volume ratio of 70/20/10 to prepare a solvent for dissolving an electrolyte salt, and to this solvent for dissolving an electrolyte salt was added LiPF$_6$ (IIa-1) to give a concentration of 1.0 mole/liter, followed by sufficiently stirring at 25° C. to prepare an electrolytic solution for comparison.

Comparative Example 6

HCF$_2$CF$_2$CH$_2$OCF$_2$CFHCF$_3$ (Aa), ethylene carbonate (Ba-1) and diethyl carbonate (Ca) were mixed in a % by volume ratio of 65/5/30 to prepare a solvent for dissolving an electrolyte salt, and to this solvent for dissolving an electrolyte salt was added LiPF$_6$ (IIa-1) to give a concentration of 1.0 mole/liter, followed by sufficiently stirring at 25° C. to prepare an electrolytic solution for comparison.

Test Example 1

Solubility of Electrolyte Salt 6 ml each of the electrolytic solutions prepared in Examples 1 to 10 and Comparative Examples 1 to 6, respectively was poured in a 9 ml sample bottle, followed by allowing to stand at 25° C. for eight hours, and then a state of liquids was observed with naked eyes. The results are shown in Table 1.

(Criteria for Evaluation)
○: Liquid is a homogeneous solution.
Δ: Electrolyte salt is precipitated.
X: Liquid is subject to phase separation.

Test Example 2

Stability at Low Temperature 6 ml each of the electrolytic solutions prepared in Examples 1 to 10 and Comparative Examples 1 to 6, respectively was poured in a 9 ml sample bottle, followed by allowing to stand for eight hours in a refrigerator of −20° C., and then a state of liquids was observed with naked eyes. The results are shown in Table 1.

(Criteria for Evaluation)
○: Liquid is a homogeneous solution.
Δ: Electrolyte salt is precipitated.
X: Liquid is solidified.

TABLE 1

| | Example | | | | | | | | | |
|---|---|---|---|---|---|---|---|---|---|---|
| | 1 | 2 | 3 | 4 | 5 | 6 | 7 | 8 | 9 | 10 |
| Electrolytic solution Composition of solvent Component (A) | | | | | | | | | | |
| Kind | Aa | Aa | Aa | Aa | Aa | Aa | Aa | Aa | Aa | Aa |
| Proportion (% by volume) | 50 | 50 | 50 | 50 | 60 | 40 | 40 | 55 | 50 | 50 |
| Component (B) | | | | | | | | | | |
| Kind | Ba-1 | Ba-1 | Ba-1 | Ba-1 | Ba-1 | Ba-1 | Ba-1 | Ba-1 | Ba-2 | Ba-2 |
| Proportion (% by volume) | 3 | 10 | 3 | 3 | 5 | 20 | 15 | 7 | 3 | 10 |
| Component (C) | | | | | | | | | | |
| Kind | Ca | Ca | Ca | Ca | Ca | Ca | Ca | Ca | Ca | Ca |
| Proportion (% by volume) | 47 | 40 | 47 | 45 | 35 | 40 | 45 | 38 | 47 | 40 |
| Component (D) | | | | | | | | | | |
| Kind | — | — | — | Da | — | — | — | — | — | — |
| Proportion (% by volume) | — | — | — | 2 | — | — | — | — | — | — |
| Electrolyte salt (concentration in mole/liter) | | | | | | | | | | |
| (IIa-1) | 1.0 | 1.0 | — | 1.0 | 1.0 | 1.0 | 1.0 | 1.0 | 1.0 | 1.0 |
| (IIa-2) | — | — | 1.0 | — | — | — | — | — | — | — |
| Solubility of electrolyte salt | ○ | ○ | ○ | ○ | ○ | ○ | ○ | ○ | ○ | ○ |
| Stability at low temperature | ○ | ○ | ○ | ○ | ○ | ○ | ○ | ○ | ○ | ○ |

TABLE 1-continued

|  | Comparative Example | | | | | |
| --- | --- | --- | --- | --- | --- | --- |
|  | 1 | 2 | 3 | 4 | 5 | 6 |
| Electrolytic solution Composition of solvent Component (A) | | | | | | |
| Kind | — | Aa | Aa | Aa | Aa | Aa |
| Proportion (% by volume) | — | 50 | 70 | 50 | 70 | 65 |
| Component (B) | | | | | | |
| Kind | Ba-1 | Ba-1 | Ba-1 | — | Ba-1 | Ba-1 |
| Proportion (% by volume) | 10 | 1 | 10 | — | 20 | 5 |
| Component (C) | | | | | | |
| Kind | Ca | Ca | Ca | Ca | Ca | Ca |
| Proportion (% by volume) | 90 | 49 | 20 | 50 | 10 | 30 |
| Component (D) | | | | | | |
| Kind | — | — | — | — | — | — |
| Proportion (% by volume) | — | — | — | — | — | — |
| Electrolyte salt (concentration in mole/liter) | | | | | | |
| (IIa-1) | 1.0 | 1.0 | 1.0 | 1.0 | 1.0 | 1.0 |
| (IIa-2) | — | — | — | — | — | — |
| Solubility of electrolyte salt | ○ | Δ | Δ | Δ | Δ | Δ |
| Stability at low temperature | X | X | X | X | X | X |

Test Example 3

Ionic Conductivity

Ionic conductivity of the electrolytic solutions prepared in Examples 1, 2, 4 and 5 and Comparative Examples 1, 2 and 4 was measured by the following method. The results are shown in Table 2.
(Test Method)

Ionic conductivity is measured at room temperature by a.c. 4-terminal method. Impedance measuring equipment SI1280B available from TOYO CORPORATION is used, and a frequency is $10^4$ Hz to $10^1$ Hz.

Test Example 4

Charge and Discharge Characteristics

A coin type lithium secondary battery was produced by the following method.
(Preparation of Positive Electrode)

An active material for a positive electrode prepared by mixing $LiCoO_2$, carbon black and polyvinylidene fluoride (trade name KF-1000 available from KUREHA CORPORATION) in a % by mass ratio of 85/6/9 was dispersed in N-methyl-2-pyrrolidone to be formed into a slurry which was then uniformly coated on a positive electrode current collector (20 μm thick aluminum foil). After drying, the coated aluminum foil was punched into a disc form having a diameter of 12.5 mm to prepare a positive electrode.
(Preparation of Negative Electrode)

A styrene-butadiene rubber dispersed in distilled water was added to artificial graphite powder (trade name KS-44 available from TIMCAL) to give a solid content of 6% by mass, followed by mixing with a disperser to be formed into a slurry which was then uniformly coated on a negative electrode current collector (18 μm thick aluminum foil). After drying, the coated aluminum foil was punched into a disc form having a diameter of 12.5 mm to prepare a negative electrode.
(Preparation of Separator)

The electrolytic solutions prepared in the above-mentioned Examples and Comparative Examples were impregnated in a polyethylene separator (trade name Celgard 3501 available from Celgard Co., Ltd.) having a diameter of 14 mm to prepare a separator.
(Preparation of Coin Type Lithium Secondary Battery)

The above-mentioned positive electrode was put in a stainless steel can which doubled as a current collector for a positive electrode, and then the above-mentioned negative electrode was put thereon with the separator being placed between them. This can and a sealing sheet which doubled as a current collector for a negative electrode were sealed by caulking with an insulating gasket being placed between them to make a coin type lithium secondary battery.
(Charge and Discharge Test)

Discharge capacity after 50 cycles was measured under the following charge and discharge measuring conditions. Evaluation is indicated by an index assuming that the result of Comparative Example 1 to be 100. The results are shown in Table 2.

Charge and discharge voltage: 2.5 to 4.2 V

Charging: A constant voltage is maintained at 0.5 C at 4.2 V until a charge current reaches 1/10.

Discharging: 1 C

Test Example 5

Flame Retardancy Test

Flame retardancy of the electrolytic solutions was examined by the following methods. The Results are Shown in Table 2.

(Preparation of Sample)

The positive electrode and negative electrode prepared in the same manner as in Test Example 4 were cut into rectangular pieces of 50 mm×100 mm, and a polyethylene separator (available from Celgard Co., Ltd., trade name Celgard 3501) was sandwiched between these cut electrodes to make a laminated article. After welding a 5 mm wide×150 mm long aluminum foil as a lead wire to the positive electrode and the negative electrode, this laminated article was dipped in the electrolytic solutions prepared in the above-mentioned Examples and Comparative Examples and then sealed with a laminator to prepare laminated cells.

(Test Method)

The following three flame retardancy tests were carried out by using the laminated cells.

[Nail Piercing Test]

After charging the laminated cell up to 4.3 V, a nail of 3 mm diameter is pierced through the laminated cell, and whether firing or bursting of the laminated cell occurs is examined. When no firing (bursting) occurs, it is shown by ◯, and when firing (bursting) occurs, it is shown by X.

[Over-Charge Test]

The laminated cell is charged for 24 hours at 10 hour rate, and whether firing of the laminated cell occurs is examined. When no firing (bursting) occurs, it is shown by ◯, and when firing (bursting) occurs, it is shown by X.

[Short-Circuit Test]

After charging the laminated cell up to 4.3 V, the positive electrode and the negative electrode are subjected to short-circuit with a copper wire to check to see if firing or bursting of the laminated cell occurs. When no firing (bursting) occurs, it is shown by ◯, and when firing (bursting) occurs, it is shown by X.

TABLE 2

| | Example | | | | Comparative Example | | |
|---|---|---|---|---|---|---|---|
| | 1 | 2 | 4 | 5 | 1 | 2 | 4 |
| Electrolytic solution Composition of solvent Component (A) | | | | | | | |
| Kind | Aa | Aa | Aa | Aa | — | Aa | Aa |
| Proportion (% by volume) | 50 | 50 | 50 | 60 | — | 50 | 50 |
| Component (B) | | | | | | | |
| Kind | Ba-1 | Ba-1 | Ba-1 | Ba-1 | Ba-1 | Ba-1 | — |
| Proportion (% by volume) | 3 | 10 | 3 | 5 | 10 | 1 | — |
| Component (C) | | | | | | | |
| Kind | Ca | Ca | Ca | Ca | Ca | Ca | Ca |
| Proportion (% by volume) | 47 | 40 | 45 | 35 | 90 | 49 | 50 |
| Component (D) | | | | | | | |
| Kind | — | — | Da | — | — | — | — |
| Proportion (% by volume) | — | — | 2 | — | — | — | — |
| Electrolyte salt (concentration in mole/liter) | | | | | | | |
| (IIa-1) | 1.0 | 1.0 | 1.0 | 1.0 | 1.0 | 1.0 | 1.0 |
| Ionic conductivity (mS/cm) | 2.07 | 2.97 | 2.54 | 2.18 | 3.85 | 1.86 | 1.65 |
| Discharge capacity (index) | 97 | 101 | 96 | 94 | 100 | 51 | 53 |
| Flame retardancy | | | | | | | |
| Nail piercing test | ◯ | ◯ | ◯ | ◯ | X | ◯ | ◯ |
| Over-charge test | ◯ | ◯ | ◯ | ◯ | X | ◯ | ◯ |
| Short-circuit test | ◯ | ◯ | ◯ | ◯ | X | ◯ | ◯ |

Test Example 6

Ignition Test

Noncombustibility (non-ignition property) of the electrolytic solutions prepared in Examples 1 and 4 and Comparative Example 1 was examined by the following methods. The results are shown in Table 3.

(Preparation of Sample)

A strip of cellulose paper (15 mm wide×320 mm long×0.04 mm thick) was fully dipped in the electrolytic solutions prepared in the above-mentioned Examples and Comparative Example, and then taken out to make a sample.

(Test Method)

The sample is fixed on a metallic stand, and a flame of a lighter is set near one end of the sample and kept as it is for one second to check to see whether ignition occurs. When ignition occurs, a fired length of the sample is measured. The test is carried out three times, and an average value is taken.

TABLE 3

| | Example | | Com. Ex. 1 |
|---|---|---|---|
| | 1 | 4 | |
| Electrolytic solution Composition of solvent Component (A) | | | |
| Kind | Aa | Aa | — |
| Proportion (% by volume) | 50 | 50 | — |
| Component (B) | | | |
| Kind | Ba-1 | Ba-1 | Ba-1 |
| Proportion (% by volume) | 3 | 3 | 10 |
| Component (C) | | | |
| Kind | Ca | Ca | Ca |
| Proportion (% by volume) | 47 | 45 | 90 |
| Component (D) | | | |
| Kind | — | Da | — |
| Proportion (% by volume) | — | 2 | — |
| Electrolyte salt (concentration in mole/liter) | | | |
| LiPF$_6$ | 1.0 | 1.0 | 1.0 |
| LiBF$_4$ | — | — | — |
| Noncombustibility (non-ignition property) | | | |
| Fired length (cm) | 3 | no ignition | 7 |

The second embodiment of the present invention is then explained by means of examples, but the present invention is not limited to them.

Compounds used in examples and comparative examples are as follows.

Component (Ab)
    (Ab-1): $HCF_2CF_2CH_2OCF_2CFHCF_3$
    (Ab-2): $CF_3CF_2CH_2OCF_2CFHCF_3$ Component (Bb)
    (Bb-1): Ethylene carbonate
    (Bb-2): Vinylene carbonate Component (Cb)
    (Cb-1): Dimethyl carbonate
    (Cb-2): Diethyl carbonate
    (Cb-3): Ethyl methyl carbonate Component (Db)
    (Db-1): Tri-2,2,3,3,3-pentafluoropropyl phosphate
    (Db-2): Trimethyl phosphate Electrolyte salt (IIb-1)
    (IIb-1-1): $LiN(SO_2C_2F_5)_2$
    (IIb-1-2): $LiN(SO_2CF_3)_2$ Electrolyte salt (IIb-2)
    (IIb-2-1): $LiPF_6$
    (IIb-2-2): $LiBF_4$

Example 11

$HCF_2CF_2CH_2OCF_2CFHCF_3$ (Ab-1) as the component (Ab), ethylene carbonate (Bb-1) as the component (Bb) and dimethyl carbonate (Cb-1) as the component (Cb) were mixed in a % by volume ratio of (Aa)/(Bb)/(Cb) of 30/3/67 to prepare a solvent for dissolving an electrolyte salt, and to this solvent for dissolving an electrolyte salt was added LiN(SO$_2$C$_2$F$_5$)$_2$ (IIb-1-1) as the electrolyte salt (IIb-1) to give a concentration of 1.0 mole/liter, followed by sufficiently stirring at 25° C. to prepare the electrolytic solution of the present invention.

Examples 12 to 70

Electrolytic solutions of the present invention were prepared in the same manner as in Example 11 by mixing compounds shown in Tables 4 to 6 as the component (Ab), the component (Bb), the component (Cb), the electrolyte salt (IIb-1), the component (Db) and the electrolyte salt (IIb-2) in amounts shown in Tables 4 to 6.

Comparative Example 7

A solvent for dissolving an electrolyte salt was prepared by mixing ethylene carbonate (Bb-1) and dimethyl carbonate (Cb-1) in a % by volume ratio of 15/85 without mixing the component (Ab), and to this solvent for dissolving an electrolyte salt was added $LiPF_6$ (IIb-2-1) to give a concentration of 1.0 mole/liter, followed by sufficiently stirring at 25° C. to prepare an electrolytic solution for comparison.

Comparative Examples 8 to 14

Electrolytic solutions for comparison were prepared by mixing compounds shown in Table 7 as the component (Ab), the component (Bb), the component (Cb), the electrolyte salt (IIb-1), the component (Db) and the electrolyte salt (IIb-2) in amounts shown in Table 7 in the same manner as in Example 11.

Test Example 7

Solubility of Electrolyte Salt 6 ml each of the electrolytic solutions prepared in Examples 11 to 70 and Comparative Examples 8 to 14, respectively was poured in a 9 ml sample bottle, followed by allowing to stand at 25° C. for eight hours, and then a state of liquids was observed with naked eyes. The results are shown in Tables 4 to 7.

(Criteria for Evaluation)
◯: Liquid is a homogeneous solution.
Δ: Electrolyte salt is precipitated.
X: Liquid is subject to phase separation.

Test Example 8

Stability at Low Temperature 6 ml each of the electrolytic solutions prepared in Examples 11 to 70 and Comparative Examples 8 to 14, respectively was poured in a 9 ml sample bottle, followed by allowing to stand for eight hours in a refrigerator of −20° C., and then a state of liquids was observed with naked eyes. The results are shown in Tables 4 to 7.

(Criteria for Evaluation)
◯: Liquid is a homogeneous solution.
Δ: Electrolyte salt is precipitated.
X: Liquid is solidified.

TABLE 4

|  | Example | | | | | | | | | |
|---|---|---|---|---|---|---|---|---|---|---|
|  | 11 | 12 | 13 | 14 | 15 | 16 | 17 | 18 | 19 | 20 |
| Electrolytic solution Composition of solvent Component (A) | | | | | | | | | | |
| Kind | Ab-1 | Ab-1 | Ab-1 | Ab-1 | Ab-1 | Ab-1 | Ab-1 | Ab-1 | Ab-1 | Ab-1 |
| Proportion (% by volume) | 30 | 30 | 30 | 30 | 30 | 30 | 40 | 40 | 40 | 40 |
| Component (B) | | | | | | | | | | |
| Kind | Bb-1 | Bb-1 | Bb-1 | Bb-1 | Bb-1 | Bb-1 | Bb-1 | Bb-1 | Bb-2 | Bb-2 |
| Proportion (% by volume) | 3 | 5 | 10 | 20 | 30 | 40 | 5 | 10 | 20 | 30 |
| Component (C) | | | | | | | | | | |
| Kind | Cb-1 | Cb-1 | Cb-1 | Cb-1 | Cb-1 | Cb-1 | Cb-1 | Cb-1 | Cb-1 | Cb-1 |
| Proportion (% by volume) | 67 | 65 | 60 | 50 | 40 | 30 | 55 | 50 | 40 | 30 |
| Component (D) | | | | | | | | | | |
| Kind | — | — | — | — | — | — | — | — | — | — |
| Proportion (% by volume) | — | — | — | — | — | — | — | — | — | — |

TABLE 4-continued

| Electrolyte salt (concentration in mole/liter) | | | | | | | | | | |
|---|---|---|---|---|---|---|---|---|---|---|
| (IIb-1-1) | 1.0 | 1.0 | 1.0 | 1.0 | 1.0 | 1.0 | 1.0 | 1.0 | 1.0 | 1.0 |
| (IIb-1-2) | — | — | — | — | — | — | — | — | — | — |
| (IIb-2-1) | — | — | — | — | — | — | — | — | — | — |
| (IIb-2-2) | — | — | — | — | — | — | — | — | — | — |
| Solubility of electrolyte salt | ○ | ○ | ○ | ○ | ○ | ○ | ○ | ○ | ○ | ○ |
| Stability at low temperature | ○ | ○ | ○ | ○ | ○ | ○ | ○ | ○ | ○ | ○ |

|  | Example | | | | | | | | | |
|---|---|---|---|---|---|---|---|---|---|---|
|  | 21 | 22 | 23 | 24 | 25 | 26 | 27 | 28 | 29 | 30 |
| Electrolytic solution Composition of solvent Component (A) | | | | | | | | | | |
| Kind | Ab-1 | Ab-1 | Ab-1 | Ab-1 | Ab-1 | Ab-1 | Ab-1 | Ab-1 | Ab-1 | Ab-1 |
| Proportion (% by volume) | 40 | 50 | 50 | 50 | 50 | 50 | 60 | 60 | 60 | 60 |
| Component (B) | | | | | | | | | | |
| Kind | Bb-1 | Bb-1 | Bb-1 | Bb-1 | Bb-1 | Bb-1 | Bb-1 | B-1 | Bb-1 | Bb-2 |
| Proportion (% by volume) | 40 | 5 | 10 | 20 | 30 | 40 | 5 | 10 | 15 | 20 |
| Component (C) | | | | | | | | | | |
| Kind | Cb-1 | Cb-1 | Cb-1 | Cb-1 | Cb-1 | Cb-1 | Cb-1 | Cb-1 | Cb-1 | Cb-1 |
| Proportion (% by volume) | 20 | 45 | 40 | 30 | 20 | 10 | 35 | 30 | 25 | 20 |
| Component (D) | | | | | | | | | | |
| Kind | — | — | — | — | — | — | — | — | — | — |
| Proportion (% by volume) | — | — | — | — | — | — | — | — | — | — |
| Electrolyte salt (concentration in mole/liter) | | | | | | | | | | |
| (IIb-1-1) | 1.0 | 1.0 | 1.0 | 1.0 | 1.0 | 1.0 | 1.0 | 1.0 | 1.0 | 1.0 |
| (IIb-1-2) | — | — | — | — | — | — | — | — | — | — |
| (IIb-2-1) | — | — | — | — | — | — | — | — | — | — |
| (IIb-2-2) | — | — | — | — | — | — | — | — | — | — |
| Solubility of electrolyte salt | ○ | ○ | ○ | ○ | ○ | ○ | ○ | ○ | ○ | ○ |
| Stability at low temperature | ○ | ○ | ○ | ○ | ○ | ○ | ○ | ○ | ○ | Δ |

TABLE 5

|  | Example | | | | | | | | | |
|---|---|---|---|---|---|---|---|---|---|---|
|  | 31 | 32 | 33 | 34 | 35 | 36 | 37 | 38 | 39 | 40 |
| Electrolytic solution Composition of solvent Component (A) | | | | | | | | | | |
| Kind | Ab-1 | Ab-1 | Ab-1 | Ab-1 | Ab-1 | Ab-1 | Ab-1 | Ab-1 | Ab-1 | Ab-1 |
| Proportion (% by volume) | 30 | 30 | 30 | 30 | 30 | 30 | 40 | 40 | 40 | 40 |
| Component (B) | | | | | | | | | | |
| Kind | Bb-1 | Bb-1 | Bb-1 | Bb-1 | Bb-2 | Bb-1 | Bb-1 | B-1 | Bb-2 | Bb-2 |
| Proportion (% by volume) | 3 | 5 | 10 | 20 | 30 | 40 | 5 | 10 | 20 | 30 |
| Component (C) | | | | | | | | | | |
| Kind | Cb-2 | Cb-3 | Cb-3 | Cb-1 | Cb-3 | Cb-3 | Cb-3 | Cb-2 | Cb-2 | Cb-3 |
| Proportion (% by volume) | 67 | 65 | 60 | 50 | 40 | 30 | 55 | 50 | 40 | 30 |
| Component (D) | | | | | | | | | | |
| Kind | — | — | — | — | — | — | — | — | — | — |
| Proportion (% by volume) | — | — | — | — | — | — | — | — | — | — |
| Electrolyte salt (concentration in mole/liter) | | | | | | | | | | |
| (IIb-1-1) | — | — | — | — | — | — | — | — | — | — |
| (IIb-1-2) | 0.7 | 0.7 | 0.7 | 0.7 | 0.8 | 0.9 | 0.7 | 0.7 | 0.7 | 0.7 |
| (IIb-2-1) | 0.3 | 0.3 | 0.3 | 0.3 | 0.2 | 0.1 | 0.3 | 0.3 | 0.3 | 0.3 |
| (IIb-2-2) | — | — | — | — | — | — | — | — | — | — |
| Solubility of electrolyte salt | ○ | ○ | ○ | ○ | ○ | ○ | ○ | ○ | ○ | ○ |
| Stability at low temperature | ○ | ○ | ○ | ○ | ○ | ○ | ○ | ○ | ○ | ○ |

TABLE 5-continued

|  | Example | | | | | | | | | |
|---|---|---|---|---|---|---|---|---|---|---|
|  | 41 | 42 | 43 | 44 | 45 | 46 | 47 | 48 | 49 | 50 |
| Electrolytic solution Composition of solvent Component (A) | | | | | | | | | | |
| Kind | Ab-1 | Ab-1 | Ab-1 | Ab-1 | Ab-1 | Ab-1 | Ab-1 | Ab-1 | Ab-1 | Ab-1 |
| Proportion (% by volume) | 40 | 50 | 50 | 50 | 50 | 50 | 60 | 60 | 60 | 60 |
| Component (B) | | | | | | | | | | |
| Kind | Bb-1 | Bb-1 | Bb-1 | Bb-1 | Bb-1 | Bb-1 | Bb-1 | B-1 | Bb-1 | Bb-2 |
| Proportion (% by volume) | 40 | 5 | 10 | 20 | 30 | 40 | 5 | 10 | 15 | 20 |
| Component (C) | | | | | | | | | | |
| Kind | Cb-2 | Cb-3 | Cb-3 | Cb-2 | Cb-3 | Cb-1 | Cb-2 | Cb-3 | Cb-2 | Cb-3 |
| Proportion (% by volume) | 20 | 45 | 40 | 30 | 20 | 10 | 35 | 30 | 25 | 20 |
| Component (D) | | | | | | | | | | |
| Kind | — | — | — | — | — | — | — | — | — | — |
| Proportion (% by volume) | — | — | — | — | — | — | — | — | — | — |
| Electrolyte salt (concentration in mole/liter) | | | | | | | | | | |
| (IIb-1-1) | — | — | — | — | — | — | — | — | — | — |
| (IIb-1-2) | 0.9 | 0.7 | 0.7 | 0.7 | 0.7 | 0.9 | 0.7 | 0.7 | 0.7 | 0.8 |
| (IIb-2-1) | 0.1 | 0.3 | 0.3 | 0.3 | 0.3 | 0.1 | 0.3 | 0.3 | 0.3 | 0.2 |
| (IIb-2-2) | — | — | — | — | — | — | — | — | — | — |
| Solubility of electrolyte salt | ○ | ○ | ○ | ○ | ○ | ○ | ○ | ○ | ○ | ○ |
| Stability at low temperature | ○ | ○ | ○ | ○ | ○ | ○ | ○ | ○ | ○ | Δ |

TABLE 6

|  | Example | | | | | | | | | |
|---|---|---|---|---|---|---|---|---|---|---|
|  | 51 | 52 | 53 | 54 | 55 | 56 | 57 | 58 | 59 | 60 |
| Electrolytic solution Composition of solvent Component (A) | | | | | | | | | | |
| Kind | Ab-1 | Ab-1 | Ab-1 | Ab-1 | Ab-1 | Ab-1 | Ab-1 | Ab-1 | Ab-1 | Ab-1 |
| Proportion (% by volume) | 30 | 30 | 30 | 30 | 30 | 30 | 40 | 40 | 40 | 40 |
| Component (B) | | | | | | | | | | |
| Kind | Bb-1 | Bb-1 | Bb-1 | Bb-1 | Bb-2 | Bb-1 | Bb-1 | B-1 | Bb-2 | Bb-2 |
| Proportion (% by volume) | 3 | 5 | 10 | 15 | 30 | 40 | 5 | 10 | 20 | 25 |
| Component (C) | | | | | | | | | | |
| Kind | Cb-2 | Cb-3 | Cb-3 | Cb-1 | Cb-3 | Cb-3 | Cb-3 | Cb-2 | Cb-2 | Cb-3 |
| Proportion (% by volume) | 62 | 60 | 50 | 45 | 40 | 30 | 55 | 45 | 40 | 30 |
| Component (D) | | | | | | | | | | |
| Kind | Db-1 | Db-2 | Db-1 | Db-2 | — | — | — | Db-2 | — | Db-2 |
| Proportion (% by volume) | 5 | 5 | 10 | 10 | — | — | — | 5 | — | 5 |
| Electrolyte salt (concentration in mole/liter) | | | | | | | | | | |
| (IIb-1-1) | — | — | — | — | — | — | — | — | — | — |
| (IIb-1-2) | 0.7 | 0.7 | 0.7 | 0.7 | 0.8 | 0.9 | 0.7 | 0.7 | 0.7 | 0.7 |
| (IIb-2-1) | — | — | — | — | — | — | — | — | — | — |
| (IIb-2-2) | 0.3 | 0.3 | 0.3 | 0.3 | 0.2 | 0.1 | 0.3 | 0.3 | 0.3 | 0.3 |
| Solubility of electrolyte salt | ○ | ○ | ○ | ○ | ○ | ○ | ○ | ○ | ○ | ○ |
| Stability at low temperature | ○ | ○ | ○ | ○ | ○ | ○ | ○ | ○ | ○ | ○ |

|  | Example | | | | | | | | | |
|---|---|---|---|---|---|---|---|---|---|---|
|  | 61 | 62 | 63 | 64 | 65 | 66 | 67 | 68 | 69 | 70 |
| Electrolytic solution Composition of solvent Component (A) | | | | | | | | | | |
| Kind | Ab-2 | Ab-2 | Ab-2 | Ab-2 | Ab-2 | Ab-2 | Ab-2 | Ab-2 | Ab-2 | Ab-2 |
| Proportion (% by volume) | 30 | 30 | 40 | 40 | 40 | 50 | 50 | 50 | 60 | 60 |

TABLE 6-continued

| Component (B) | | | | | | | | | | |
|---|---|---|---|---|---|---|---|---|---|---|
| Kind | Bb-1 | Bb-1 | Bb-1 | Bb-1 | Bb-2 | Bb-1 | Bb-1 | B-1 | Bb-2 | Bb-2 |
| Proportion (% by volume) | 3 | 10 | 10 | 15 | 20 | 10 | 15 | 20 | 5 | 10 |
| Component (C) | | | | | | | | | | |
| Kind | Cb-1 | Cb-1 | Cb-3 | Cb-3 | Cb-3 | Cb-3 | Cb-3 | Cb-2 | Cb-2 | Cb-3 |
| Proportion (% by volume) | 67 | 60 | 50 | 45 | 40 | 40 | 35 | 30 | 35 | 30 |
| Component (D) | | | | | | | | | | |
| Kind | — | — | — | — | — | — | — | — | — | — |
| Proportion (% by volume) | — | — | — | — | — | — | — | — | — | — |
| Electrolyte salt (concentration in mole/liter) | | | | | | | | | | |
| (IIb-1-1) | — | — | — | 1.0 | 1.0 | 1.0 | 1.0 | 1.0 | 1.0 | 1.0 |
| (IIb-1-2) | 0.7 | 0.7 | 0.7 | — | — | — | — | — | — | — |
| (IIb-2-1) | 0.3 | 0.3 | 0.3 | — | — | — | — | — | — | — |
| (IIb-2-2) | — | — | — | — | — | — | — | — | — | — |
| Solubility of electrolyte salt | ○ | ○ | ○ | ○ | ○ | ○ | ○ | ○ | ○ | ○ |
| Stability at low temperature | ○ | ○ | ○ | ○ | ○ | ○ | ○ | ○ | ○ | ○ |

TABLE 7

| | Comparative Example | | | | | | | |
|---|---|---|---|---|---|---|---|---|
| | 7 | 8 | 9 | 10 | 11 | 12 | 13 | 14 |
| Electrolytic solution Composition of solvent Component (A) | | | | | | | | |
| Kind | — | Ab-1 | Ab-1 | Ab-1 | Ab-1 | Ab-2 | Ab-2 | Ab-2 |
| Proportion (% by volume) | — | 30 | 20 | 70 | 40 | 50 | 70 | 60 |
| Component (B) | | | | | | | | |
| Kind | Bb-1 | Bb-1 | Bb-1 | Bb-1 | Bb-1 | Bb-1 | Bb-1 | Bb-2 |
| Proportion (% by volume) | 15 | 50 | 20 | 30 | 50 | 45 | 20 | 2 |
| Component (C) | | | | | | | | |
| Kind | Cb-1 | Cb-1 | Cb-1 | Cb-3 | Cb-1 | Cb-3 | Cb-2 | Cb-3 |
| Proportion (% by volume) | 85 | 20 | 60 | 0 | 10 | 5 | 10 | 38 |
| Component (D) | | | | | | | | |
| Kind | — | — | — | — | — | — | — | — |
| Proportion (% by volume) | — | — | — | — | — | — | — | — |
| Electrolyte salt (concentration in mole/liter) | | | | | | | | |
| (IIb-1-1) | — | 1.0 | 1.0 | 1.0 | 1.0 | 1.0 | 1.0 | — |
| (IIb-1-2) | — | — | — | — | — | — | — | 0.8 |
| (IIb-2-1) | 1.0 | — | — | — | — | — | — | 0.2 |
| (IIb-2-2) | — | — | — | — | — | — | — | — |
| Solubility of electrolyte salt | ○ | ○ | ○ | X | X | X | X | X |
| Stability at low temperature | X | X | ○ | X | X | X | X | X |

Test Example 9

Ionic Conductivity

Ionic conductivity of the electrolytic solutions prepared in Examples 11, 13, 18, 19, 23, 24, 28, 33, 38, 39 and 43 and Comparative Examples 7 and 9 was measured by the following method. The results are shown in Tables 8 and 9.

(Test Method)

Ionic conductivity is measured at room temperature by a.c. 4-terminal method. Impedance measuring equipment SI1280B available from TOYO CORPORATION is used, and a frequency is $10^4$ Hz to $10^1$ Hz.

Test Example 10

Charge and Discharge Characteristics

A coin type lithium secondary battery was produced by the following method.

(Preparation of Positive Electrode)

An active material for a positive electrode prepared by mixing $LiCoO_2$, carbon black and polyvinylidene fluoride (trade name KF-1000 available from KUREHA CORPORATION) in a % by mass ratio of 85/6/9 was dispersed in N-methyl-2-pyrrolidone to be formed into a slurry which was then uniformly coated on a positive electrode current collector (20 μm thick aluminum foil). After drying, the coated aluminum foil was punched into a disc form having a diameter of 12.5 mm to prepare a positive electrode.

(Preparation of Negative Electrode)

A styrene-butadiene rubber dispersed in distilled water was added to artificial graphite powder (trade name KS-44 available from TIMCAL) to give a solid content of 6% by mass, followed by mixing with a disperser to be formed into a slurry which was then uniformly coated on a negative electrode current collector (18 μm thick aluminum foil). After drying, the coated aluminum foil was punched into a disc form having a diameter of 12.5 mm to prepare a negative electrode.

(Preparation of Separator)

The electrolytic solutions prepared in the above-mentioned Examples and Comparative Examples were impregnated in a polyethylene separator (trade name Celgard 3501 available from Celgard Co., Ltd.) having a diameter of 14 mm to prepare a separator.

(Preparation of Coin Type Lithium Secondary Battery)

The above-mentioned positive electrode was put in a stainless steel can which doubled as a current collector for a positive electrode, and then the above-mentioned negative electrode was put thereon with the separator being placed between them. This can and a sealing sheet which doubled as a current collector for a negative electrode were sealed by caulking with an insulating gasket being placed between them to make a coin type lithium secondary battery.

(Charge and Discharge Test)

Discharge capacity after 50 cycles was measured under the following charge and discharge measuring conditions. Evaluation is indicated by an index assuming that the result of Example 23 to be 100. The results are shown in Tables 8 and 9.

Charge and discharge voltage: 2.5 to 4.2 V
Charging: A constant voltage is maintained at 0.5 C at 4.2 V until a charge current reaches 1/10.
Discharging: 1 C Test Example 11

Flame Retardancy Test

Flame retardancy of the electrolyte salts was examined by the following methods. The Results are Shown in Tables 8 and 9.

(Preparation of Sample)

The positive electrode and negative electrode prepared in the same manner as in Test Example 10 were cut into rectangular pieces of 50 mm×100 mm, and a polyethylene separator (available from Celgard Co., Ltd., trade name Celgard 3501) was sandwiched between these cut electrodes to make a laminated article. After welding a 5 mm wide×150 mm long aluminum foil as a lead wire to the positive electrode and the negative electrode, this laminated article was dipped in the electrolytic solutions prepared in the above-mentioned Examples and Comparative Examples and then sealed with a laminator to prepare laminated cells.

(Test Method)

The following three flame retardancy tests were carried out using the laminated cells.

[Nail Piercing Test]

After charging the laminated cell up to 4.3 V, a nail of 3 mm diameter is pierced through the laminated cell, and whether firing or bursting of the laminated cell occurs is examined. When no firing (bursting) occurs, it is shown by ○, and when firing (bursting) occurs, it is shown by X.

[Over-Charge Test]

The laminated cell is charged for 24 hours at 10 hour rate, and whether firing of the laminated cell occurs is examined. When no firing (bursting) occurs, it is shown by ○, and when firing (bursting) occurs, it is shown by X.

[Short-Circuit Test]

After charging the laminated cell up to 4.3 V, the positive electrode and the negative electrode are subjected to short-circuit with a copper wire to check to see if firing or bursting of the laminated cell occurs. When no firing (bursting) occurs, it is shown by ○, and when firing (bursting) occurs, it is shown by X.

TABLE 8

| | Example | | | | | | |
|---|---|---|---|---|---|---|---|
| | 11 | 13 | 18 | 19 | 23 | 24 | 28 |
| Electrolytic solution Composition of solvent Component (A) | | | | | | | |
| Kind | Ab-1 | Ab-1 | Ab-1 | Ab-1 | Ab-1 | Ab-1 | Ab-1 |
| Proportion (% by volume) | 30 | 30 | 40 | 40 | 50 | 50 | 60 |
| Component (B) | | | | | | | |
| Kind | Bb-1 | Bb-1 | Bb-1 | Bb-2 | Bb-1 | Bb-1 | Bb-1 |
| Proportion (% by volume) | 3 | 10 | 10 | 20 | 10 | 20 | 10 |
| Component (C) | | | | | | | |
| Kind | Cb-1 | Cb-1 | Cb-1 | Cb-1 | Cb-1 | Cb-1 | Cb-1 |
| Proportion (% by volume) | 67 | 60 | 50 | 40 | 40 | 30 | 30 |

TABLE 8-continued

| | Example | | | | | | |
|---|---|---|---|---|---|---|---|
| | 11 | 13 | 18 | 19 | 23 | 24 | 28 |
| Component (D) | | | | | | | |
| Kind | — | — | — | — | — | — | — |
| Proportion (% by volume) | — | — | — | — | — | — | — |
| Electrolyte salt (concentration in mole/liter) | | | | | | | |
| (IIb-1-1) | 1.0 | 1.0 | 1.0 | 1.0 | 1.0 | 1.0 | 1.0 |
| (IIb-1-2) | — | — | — | — | — | — | — |
| (IIb-2-1) | — | — | — | — | — | — | — |
| (IIb-2-2) | — | — | — | — | — | — | — |
| Ionic conductivity (mS/cm) | 4.2 | 5.2 | 5.5 | 5.4 | 5.8 | 5.1 | 3.9 |
| Discharge capacity (index) | 97 | 99 | 98 | 98 | 100 | 97 | 95 |
| Flame retardancy | | | | | | | |
| Nail piercing test | ○ | ○ | ○ | ○ | ○ | ○ | ○ |
| Over-charge test | ○ | ○ | ○ | ○ | ○ | ○ | ○ |
| Short-circuit test | ○ | ○ | ○ | ○ | ○ | ○ | ○ |

TABLE 9

| | Example | | | | Com. Ex. | |
|---|---|---|---|---|---|---|
| | 33 | 38 | 39 | 43 | 7 | 9 |
| Electrolytic solution Composition of solvent Component (A) | | | | | | |
| Kind | Ab-1 | Ab-1 | Ab-1 | Ab-1 | — | Ab-1 |
| Proportion (% by volume) | 30 | 40 | 40 | 50 | — | 20 |
| Component (B) | | | | | | |
| Kind | Bb-1 | Bb-1 | Bb-2 | Bb-1 | Bb-1 | Bb-1 |
| Proportion (% by volume) | 10 | 10 | 20 | 10 | 15 | 20 |
| Component (C) | | | | | | |
| Kind | Cb-3 | Cb-2 | Cb-2 | Cb-3 | Cb-1 | Cb-1 |
| Proportion (% by volume) | 60 | 50 | 40 | 40 | 85 | 60 |
| Component (D) | | | | | | |
| Kind | — | — | — | — | — | — |
| Proportion (% by volume) | — | — | — | — | — | — |
| Electrolyte salt (concentration in mole/liter) | | | | | | |
| (IIb-1-1) | — | — | — | — | — | — |
| (IIb-1-2) | 0.7 | 0.7 | 0.7 | 0.7 | — | — |
| (IIb-2-1) | 0.3 | 0.3 | 0.3 | 0.3 | 1.0 | 1.0 |
| (IIb-2-2) | — | — | — | — | — | — |
| Ionic conductivity (mS/cm) | 5.4 | 5.0 | 5.1 | 5.7 | 5.4 | 5.8 |
| Discharge capacity (index) | 98 | 97 | 96 | 98 | 98 | 98 |
| Flame retardancy | | | | | | |
| Nail piercing test | ○ | ○ | ○ | ○ | X | X |
| Over-charge test | ○ | ○ | ○ | ○ | X | X |
| Short-circuit test | ○ | ○ | ○ | ○ | X | ○ |

Test Example 13

Ignition Test

Noncombustibility (non-ignition property) of the electrolytic solutions prepared in Examples 43 and 58 and Comparative Example 7 was examined by the following methods. The results are shown in Table 10.

(Preparation of Sample)

A strip of cellulose paper (15 mm wide×320 mm long×0.04 mm thick) was fully dipped in the electrolytic solutions prepared in the above-mentioned Examples and Comparative Example, and then taken out to make a sample.

(Test Method)

The sample is fixed on a metallic stand, and a flame of a lighter is set near one end of the sample and kept as it is for one second to check to see whether firing occurs. When ignition occurs, a fired length of the sample is measured. The test is carried out three times, and an average value is taken.

TABLE 10

|  | Example | | Com. Ex. 7 |
|---|---|---|---|
|  | 43 | 58 | |
| Electrolytic solution Composition of solvent Component (A) | | | |
| Kind | Ab-1 | Ab-1 | — |
| Proportion (% by volume) | 50 | 40 | — |
| Component (B) | | | |
| Kind | Bb-1 | Bb-1 | Bb-1 |
| Proportion (% by volume) | 10 | 10 | 15 |
| Component (C) | | | |
| Kind | Cb-3 | Cb-2 | Cb-2 |
| Proportion (% by volume) | 40 | 45 | 85 |
| Component (D) | | | |
| Kind | — | Db-2 | — |
| Proportion (% by volume) | — | 5 | — |
| Electrolyte salt (concentration in mole/liter) | | | |
| (IIb-1-1) | — | — | — |
| (IIb-1-2) | 0.7 | 0.7 | — |
| (IIb-2-1) | 0.3 | — | 1.0 |
| (IIb-2-2) | — | 0.3 | — |
| Noncombustibility (non-ignition property) | | | |
| Fired length (cm) | 2 | no ignition | 10 |

Test Example 13

Charge and Discharge Characteristics

Slurry of a positive electrode and slurry of a negative electrode were prepared in the same manner as in Test Example 10, and coated on an aluminum foil with a blade coater in a thickness of 50 μm. After fitting a lead to these positive electrode and negative electrode, respectively, a separator was sandwiched between the electrodes, and these were wound and put in a SUS304 outer can, followed by vacuum impregnation with an electrolytic solution and then sealing to prepare a cylindrical cell having a diameter of 18 mm and a height of 50 mm. A safety device such as a safety valve was not used in order to eliminate a difference in safety. Then, discharge capacity after 50 cycles was measured under the following charge and discharge measuring conditions. Evaluation is indicated by an index assuming that the result of Comparative Example 7 to be 100. The results are shown in Table 11.

Charge and discharge voltage: 2.5 to 4.2 V

Charging: A constant voltage is maintained at 0.5 C at 4.2 V until a charge current reaches 1/10.

Discharging: 1 C

Test Example 14

Flame Retardancy Test

The Following Nail Piercing Test was Carried Out Using the prepared cylindrical cells. The results are shown in Table 11.

[Nail Piercing Test]

After charging the cylindrical cell to 4.3 V, a nail of 3 mm diameter is pierced through the cylindrical cell, and whether firing or bursting of the cylindrical cell occurs is examined. When no firing (bursting) occurs, it is shown by ○, and when firing (bursting) occurs, it is shown by X.

TABLE 11

|  | Example | | | | | | Com. Ex. |
|---|---|---|---|---|---|---|---|
|  | 11 | 12 | 13 | 14 | 15 | 16 | 7 |
| Electrolytic solution Composition of solvent Component (A) | | | | | | | |
| Kind | Ab-1 | Ab-1 | Ab-1 | Ab-1 | Ab-1 | Ab-1 | — |
| Proportion (% by volume) | 30 | 30 | 30 | 30 | 30 | 30 | — |
| Component (B) | | | | | | | |
| Kind | Bb-1 | Bb-1 | Bb-1 | Bb-1 | Bb-1 | Bb-1 | Bb-1 |
| Proportion (% by volume) | 3 | 5 | 10 | 20 | 30 | 40 | 15 |
| Component (C) | | | | | | | |
| Kind | Cb-1 | Cb-1 | Cb-1 | Cb-1 | Cb-1 | Cb-1 | Cb-1 |
| Proportion (% by volume) | 67 | 65 | 60 | 50 | 40 | 30 | 85 |
| Component (D) | | | | | | | |
| Kind | — | — | — | — | — | — | — |
| Proportion (% by volume) | — | — | — | — | — | — | — |
| Electrolyte salt (concentration in mole/liter) | | | | | | | |
| (IIb-1-1) | 1.0 | 1.0 | 1.0 | 1.0 | 1.0 | 1.0 | — |
| (IIb-1-2) | — | — | — | — | — | — | — |
| (IIb-2-1) | — | — | — | — | — | — | 1.0 |
| (IIb-2-2) | — | — | — | — | — | — | — |
| Discharge capacity (index) | 101 | 103 | 98 | 102 | 103 | 100 | 100 |
| Flame retardancy | | | | | | | |
| Nail piercing test | ○ | ○ | ○ | ○ | ○ | ○ | X |

INDUSTRIAL APPLICABILITY

The present invention can provide an electrochemical device assuring no phase separation even at low temperature and having high solubility of an electrolyte salt, excellent flame retardancy and heat resistance, large discharge capacity and satisfactory charge and discharge cycle characteristics, and makes designing of a safe large size electrochemical device easy.

The invention claimed is:

1. An electrochemical device provided with an electrolytic solution comprising:
   (I) a solvent for dissolving an electrolyte salt comprising:
   (A) a fluorine-containing ether represented by the formula (1):

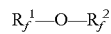

wherein $R_f^1$ and $R_f^2$ are the same or different and each is a fluorine-containing alkyl group having 3 or 4 carbon atoms, (B) a cyclic carbonate, and (C) a chain carbonate being compatible with both of the fluorine-containing ether (A) and the cyclic carbonate (B), and (II) an electrolyte salt, said solvent (I) for dissolving an electrolyte salt comprises 30 to 60% by volume of the fluorine-containing ether (A), 3 to 40% by volume of the cyclic carbonate (B) and 10 to 67% by volume of the chain carbonate (C) based on the whole solvent (I).

2. The electrochemical device of claim 1, wherein a fluorine content of the fluorine-containing ether (A) represented by the formula (1) is from 55 to 74% by mass.

3. The electrochemical device of claim 1, wherein the cyclic carbonate (B) is ethylene carbonate and/or vinylene carbonate.

4. The electrochemical device of claim 1, wherein the solvent (I) for dissolving an electrolyte salt comprises 40 to 60% by volume of the fluorine-containing ether (A), 5 to 25% by volume of the cyclic carbonate (B) and 15 to 55% by volume of the chain carbonate (C) based on the whole solvent (I).

5. The electrochemical device of claim 1, which is a battery.

6. An electrolytic solution comprising:

(I) a solvent for dissolving an electrolyte salt comprising:

(A) a fluorine-containing ether represented by the formula (1):

$$R_f^1\!-\!O\!-\!R_f^2$$

wherein $R_f^1$ and $R_f^2$ are the same or different and each is a fluorine-containing alkyl group having 3 or 4 carbon atoms, (B) a cyclic carbonate, and (C) a chain carbonate being compatible with both of the fluorine-containing ether (A) and the cyclic carbonate (B), and (II) an electrolyte salt, said solvent (I) for dissolving an electrolyte salt comprises 30 to 60% by volume of the fluorine-containing ether (A), 3 to 40% by volume of the cyclic carbonate (B) and 10 to 67% by volume of the chain carbonate (C) based on the whole solvent (I).

7. An electrolytic solution for a lithium secondary battery comprising:

(I) a solvent for dissolving an electrolyte salt comprising:

(A) a fluorine-containing ether represented by the formula (1a):

$$R_f^{1a}\!-\!O\!-\!R_f^{2a}$$

wherein $R_f^{1a}$ and $R_f^{2a}$ are the same or different and each is a fluorine-containing alkyl group having 3 or 4 carbon atoms, (B) an ethylene carbonate and/or vinylene carbonate, and (C) a chain carbonate being compatible with both of the fluorine-containing ether (A) and the ethylene carbonate and/or vinylene carbonate (B), and (II) an electrolyte salt, said solvent (I) for dissolving an electrolyte salt comprises 40 to 60% by volume of the fluorine-containing ether (A), 3 to 20% by volume of the ethylene carbonate and/or vinylene carbonate (B) and 20 to 57% by volume of the chain carbonate (C) based on the whole solvent (I), said electrolyte salt (II) is $LiPF_6$ or $LiBF_4$, and a concentration of the electrolyte salt is not less than 0.8 mole/liter.

8. The electrolytic solution for a lithium secondary battery of claim 7, wherein the solvent (I) for dissolving an electrolyte salt comprises 40 to 60% by volume of the fluorine-containing ether (A), 3 to 15% by volume of the ethylene carbonate and/or vinylene carbonate (B) and 31 to 57% by volume of the chain carbonate (C) based on the whole solvent (I), and the concentration of the electrolyte salt is not less than 1.0 mole/liter.

9. The electrolytic solution for a lithium secondary battery of claim 7, wherein a boiling point of the fluorine-containing ether (A) is not less than 90° C.

10. The electrolytic solution for a lithium secondary battery of claim 7, wherein the fluorine-containing ether (A) is $HCF_2CF_2CH_2OCF_2CFHCF_3$.

11. The electrolytic solution for a lithium secondary battery of claim 7, wherein a phosphoric ester (D) is contained in the solvent (I) for dissolving an electrolyte salt in an amount of not more than 3% by volume.

12. The electrolytic solution for a lithium secondary battery of claim 11, wherein the phosphoric ester (D) is a fluorine-containing alkylphosphoric ester.

* * * * *